United States Patent
Kanomata et al.

(10) Patent No.: US 9,029,484 B2
(45) Date of Patent: May 12, 2015

(54) PRODUCTION METHOD OF POLYARYLENE SULFIDE, CYCLIC POLYARYLENE SULFIDE PELLET AND PRODUCTION METHOD THEREOF

(71) Applicant: Toray Industries, Inc., Tokyo (JP)

(72) Inventors: Akinori Kanomata, Nagoya (JP); Yosuke Nishimura, Tokai (JP); Shunsuke Horiuchi, Nagoya (JP); Shu Kaiho, Nagoya (JP); Kazusada Takeda, Tokai (JP); Koji Yamauchi, Nagoya (JP); Junya Suzuki, Tokai (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 14/381,803

(22) PCT Filed: Feb. 27, 2013

(86) PCT No.: PCT/JP2013/001147
§ 371 (c)(1),
(2) Date: Aug. 28, 2014

(87) PCT Pub. No.: WO2013/128908
PCT Pub. Date: Sep. 6, 2013

(65) Prior Publication Data
US 2015/0057429 A1 Feb. 26, 2015

(30) Foreign Application Priority Data

Feb. 29, 2012 (JP) .................................. 2012-043341
Feb. 29, 2012 (JP) .................................. 2012-043348
Oct. 31, 2012 (JP) .................................. 2012-239947

(51) Int. Cl.
| | |
|---|---|
| C08F 283/00 | (2006.01) |
| C08G 75/14 | (2006.01) |
| C08G 75/06 | (2006.01) |
| C08J 3/12 | (2006.01) |
| B29B 13/00 | (2006.01) |

(52) U.S. Cl.
CPC .................. C08G 75/14 (2013.01); B29B 13/00 (2013.01); C08G 75/06 (2013.01); C08J 3/12 (2013.01); C08J 2381/04 (2013.01)

(58) Field of Classification Search
CPC ........ C08G 75/14; C08J 2381/04; C08J 3/12; B29B 13/00
USPC ........................................................ 525/537
See application file for complete search history.

(56) References Cited

U.S. PATENT DOCUMENTS

| | | | |
|---|---|---|---|
| 3,322,834 A | 5/1967 | Hill, Jr. et al. | |
| 3,354,129 A | 11/1967 | Edmonds et al. | |
| 5,384,391 A | 1/1995 | Miyata et al. | |
| 5,869,599 A | 2/1999 | Hay et al. | |
| 2009/0234068 A1* | 9/2009 | Horiuchi et al. | 524/609 |
| 2010/0068518 A1* | 3/2010 | Honma et al. | 428/401 |
| 2012/0065342 A1* | 3/2012 | Hamaguchi et al. | 525/437 |
| 2012/0165501 A1 | 6/2012 | Kaiho et al. | |

FOREIGN PATENT DOCUMENTS

| | | |
|---|---|---|
| JP | 45-3368 | 2/1970 |
| JP | 5-163349 A | 6/1993 |
| JP | 5-301962 A | 11/1993 |
| JP | 01-25493 | 1/2001 |
| JP | 02-182727 | 6/2002 |
| JP | 04-55445 | 2/2004 |
| JP | 05-105757 | 4/2005 |
| JP | 2009-30012 | 2/2009 |
| JP | 2009-030012 | 2/2009 |
| JP | 2009-149863 | 7/2009 |
| JP | 2010-18733 | 1/2010 |
| JP | 2010-018733 A | 1/2010 |
| JP | 2012-116918 A | 6/2012 |
| JP | 2012-176607 A | 9/2012 |
| WO | 2007/034800 | 3/2007 |
| WO | 2010/147176 A1 | 12/2010 |
| WO | 2011/013686 A1 | 2/2011 |
| WO | 2012/057319 A1 | 5/2012 |

OTHER PUBLICATIONS

Zimmerman, D.A. et al., "Polymerization of Poly(P-Phenylene Sulfide) from a Cyclic Precursor," *Polymer*, 1996, vol. 37, No. 14, pp. 3111 to 3116 (Abstract only).

* cited by examiner

*Primary Examiner* — Shane Fang
(74) *Attorney, Agent, or Firm* — DLA Piper LLP (US)

(57) ABSTRACT

A production method includes a process (I) of heating a cyclic polyarylene sulfide composition under reduced pressure and a process (II) of heating and polymerizing a cyclic polyarylene sulfide composition. This simple method allows for production of a polyarylene sulfide of the higher molecular weight and can produce a polyarylene sulfide having a narrow molecular weight distribution, low gas generation and high industrial usability. Additionally, pelletization after the process (I) can produce a cyclic polyarylene sulfide pellet having ease of conveyance, excellent molding processability, less gas generation amount and high industrial usability.

21 Claims, No Drawings

PRODUCTION METHOD OF POLYARYLENE SULFIDE, CYCLIC POLYARYLENE SULFIDE PELLET AND PRODUCTION METHOD THEREOF

TECHNICAL FIELD

This disclosure relates to a production method of an industrially useful polyarylene sulfide, which includes a process (I) of heating a cyclic polyarylene sulfide composition under reduced pressure and a process (II) of heating and polymerizing a cyclic polyarylene sulfide composition. The disclosure also relates to a cyclic polyarylene sulfide pellet having excellent handling characteristics, less gas generation amount and high industrial usability, and a production method thereof.

BACKGROUND

Polyarylene sulfides as typified by polyphenylene sulfide (hereinafter polyarylene sulfide may be abbreviated as PAS) are engineering plastics having excellent heat resistance, frame retardancy, chemical resistance, electric insulation, moist heat resistance, mechanical strength and dimensional stability. PAS is moldable into a variety of molded products, films and fibers by a variety of molding techniques such as injection molding and extrusion molding and is accordingly practiced in a wide variety of fields including electric and electronic components, machine components and automobile components.

A specific production method of PAS has been proposed to use the reaction of an alkali metal sulfide such as sodium sulfide with a polyhalogenated aromatic compound such as p-dichlorobenzene in an organic amide solvent such as N-methyl-2-pyrrolidone. That method is widely used as the industrial production method of PAS. That production method, however, has some problems, i.e., need for the reaction under the high temperature, high pressure and strongly alkaline conditions, need for an expensive high boiling-point polar solvent such as N-methylpyrrolidone, energy-intensive with high cost for recovery of the solvent and need for enormous processing cost.

Additionally, the polymerization reaction is the desalting polycondensation mechanism and thereby produces a significant amount of byproduct salts such as sodium chloride. After the polymerization reaction, removal of the byproduct salts is needed. The general treatment, however, has difficulty in complete removal of byproduct salts. Commercially available, general-purpose polyphenylene sulfide products contain alkali metal salts as byproduct salts. The weight ratio of the alkali metals in PAS is about 1000 to 3000 ppm. Leaving the alkali metal salts in the polymer product causes a problem such as deterioration of the physical properties such as electrical properties. Such deterioration of electrical properties by the alkali metals contained in the PAS interfered with application of molded products using such PAS as the raw material in the field of electric and electronic components.

The commercially available PAS produced by that method contains 2000 to 4000 ppm chlorine at the terminals. With the object of reducing the environmental load, halogen-free has recently been promoted in especially in the electrical and electronic industries. For example, the guidelines for electric and electronic components, e.g., JPCA (ES-1-2003), IEC (61249-2-21) and IPC (4101B), request that the content of chlorine atom should be reduced to or below 900 ppm. The chlorine content in PAS accordingly interferes with application of PAS to electric and electronic components.

Moreover, PAS obtained by that method is a polymer having a very high polydispersity expressed by the ratio of the weight-average molecular weight to the number-average molecular weight and a very wide molecular weight distribution (Mw/Mn) as 5.0 to 20 and including a significant amount of low molecular-weight components. In application of the above PAS to the molding process, the low molecular-weight components deteriorate the properties such as the mechanical strength and the chemical resistance and disadvantageously interfere with exertion of sufficient mechanical properties. The above PAS also has other problems such as a significant amount of gas components when being heated and a significant amount of eluent components when being exposed to a solvent. To solve such problems, a process of increasing the molecular weight by, for example, oxidative cross-linking under heating in the air has been proposed (for example, JP S45-3368 B). That method, however, causes problems, for example, complicating the process, deteriorating flowability and moldability due to the high molecular weight components produced by oxidative cross-linking under heating, and reducing the productivity.

One proposed method to solve one of the above problems of PAS, i.e., a significant amount of low molecular weight components and a wide molecular weight distribution, causes phase separation of a PAS mixture including impurities into a polymer melt phase including PAS and a solvent phase mainly comprised of a solvent at higher temperatures than the minimum temperature at which PAS is included in the melt phase and thermally extracts the impurities to purify the PAS. Another proposed method deposits and recovers a polymer in granular form by cooling. Those methods extract the impurities by the thermal extraction effect and are thus expected to reduce the metal content in the PAS and narrow the molecular weight distribution. Those methods, however, have only insufficient effects and use expensive organic solvents, which results in the complicated process (for example, JP H01-25493 B and JP H04-55445 B).

As another method has been disclosed a production method of PAS characterized by washing PAS, which is obtained by the reaction of a sulfur source with a dihalogenated aromatic compound in an organic polar solvent, with the organic polar solvent under the temperature condition of 100 to 220° C. The obtained PAS has a molecular weight distribution (Mw/Mn) in the range of 2 to 5. This method, however, has a low yield of PAS and has only the insufficient effect on the molecular weight distribution; the lowest polydispersity of the actually obtained PAS is only Mw/Mn=2.9. Additionally, that method has many other problems to be solved, for example, using a large amount of an expensive lithium compound for polymerization of PAS to have poor economic efficiency and causing some amount of lithium to remain in the PAS (for example, JP H02-182727 A).

As described above, all those methods still have many problems, i.e., poor economic efficiency and low yield resulting from using a large volume of a solvent or needing a complicated process for extraction and purification to obtain a polymer having a sufficiently narrow molecular weight distribution.

A production method of PAS by heating a cyclic PAS has been disclosed as another production method of PAS. (In the description below, a polymer of the higher degree of polymerization obtained by polymerizing polyarylene sulfide as the polymerization material including cyclic PAS and/or linear PAS may also be simply called PAS.) That method is expected to obtain a high molecular-weight PAS having a narrow molecular weight distribution and a less weight reduction by heating. The lower purity of the cyclic PAS, however, tends to produce the lower molecular weight of PAS. It is accordingly preferable to use a highly pure cyclic PAS oligomer that substantially includes no linear PAS as the polymerization material. Only a tiny amount of linear PAS is thus allowed to be mixed in the cyclic PAS oligomer. In general, a cyclic oligomer is obtained as a mixture with a significant amount of a linear oligomer, so that sophisticated purification operation is needed to obtain a highly pure cyclic body. This results in increasing the production cost of PAS, and a more practical method has accordingly been demanded (for example, WO 2007034800).

A polymerization method of polyphenylene sulfide has also been known to heat a mixture of cyclic polyphenylene sulfide and linear polyphenylene sulfide as the polymerization material (Polymer, Vol. 37, No. 14, 1996, pages 3111-3116). That method is a simple polymerization method of polyphenylene sulfide but is not practically applicable, due to its low degree of polymerization of the resulting polyphenylene sulfide. Polymer, Vol. 37, No. 14, 1996, pages 3111-3116 teaches that the higher heating temperature enhances the degree of polymerization. The resulting molecular weight, however, does not yet reach the practically applicable level. Polymer, Vol. 37, No. 14, 1996, pages 3111-3116 also cannot avoid the cross-linked structure and is capable of producing only a polyphenylene sulfide having poor thermal properties. A polymerization method of polyphenylene sulfide having the higher practical applicability and the higher quality has accordingly been demanded.

A known method uses a variety of catalyst components (for example, compounds having radical generating ability or ionic compounds) to accelerate increasing the molecular weight during conversion of cyclic PAS to a polymer of the higher degree of polymerization. More specifically, the disclosed method polymerizes a cyclic arylene sulfide oligomer by ring-opening polymerization under heating in the presence of an ionic ring-opening polymerization catalyst. That method is expected to obtain a PAS having a narrow molecular weight distribution. That method, however, uses an alkali metal sulfur compound, such as sodium salt of thiophenol, as the ring-opening polymerization catalyst for synthesis of PAS and accordingly has a problem that a significant amount of the alkali metal remains in the resulting PAS. An attempt to reduce the remaining amount of the alkali metal in the resulting PAS by using a decreased amount of the ring-opening polymerization catalyst in this method results in another problem, insufficient molecular weight of the resulting PAS. In that method, purification using a solvent is expected to reduce the remaining alkali metal to some extent. Such purification, however, uses a large amount of solvent in the production process and has disadvantages such as poor economic efficiency and low yield. The polymer obtained by that method has a polymerization initiator component remaining in one of the terminals, which causes decomposition under heating and leads to the unsatisfactory level of gas generation amount (for example, JP H05-301962 A, JP H05-163349 A and JP H05-105757 A).

A method disclosed to solve the problem of the PAS obtained by the above method, i.e., to reduce the remaining amount of the alkali metal in the resulting PAS, is a production method of PAS that polymerizes a cyclic aromatic thioether oligomer by ring-opening polymerization in the presence of a polymerization initiator that produces sulfur radical by heating. That method uses a non-ionic compound as the polymerization initiator and is thus expected to reduce the content of the alkali metal in the resulting PAS. The polyphenylene sulfide obtained by that method, however, has a low glass transition temperature as 85° C. This is because the resulting polyphenylene sulfide has a low molecular weight and includes a significant amount of low molecular-weight components to have a wide molecular weight distribution. That method accordingly still has the problems of the molecular weight and the molecular weight distribution. There is no disclosure on the weight reduction ratio by heating the polyphenylene sulfide obtained by this method. The polymerization initiator used in that method has a lower molecular weight and poorer thermal stability than polyphenylene sulfide. There is accordingly a possibility that the polyphenylene sulfide obtained by this method generates a large amount of gas by heating and has poor molding processability (for example, U.S. Pat. No. 5,869,599).

Those methods of producing cyclic PAS generally produce cyclic PAS in the powdery form (for example, WO '800, JP 2009-030012 A and JP 2009-149863 A). We found a characteristic problem that the powdery cyclic PAS mixture is compacted in a screw feeder and fails to be conveyed in the course of feeding to an extruder using the screw feeder. More specifically, the powdery cyclic PAS mixture has poor conveyance, which causes the phenomenon that the powdery cyclic PAS mixture gradually accumulates in the screw feeder and is eventually compacted not to be conveyed. This interferes with taking advantage of the inherent characteristics of the cyclic PAS, i.e., low gas generation and improved melt processability and using the powdery cyclic PAS mixture by an industrially simple method. The cause of such compaction is not clear, but it is presumed that high affinity between rings and high cohesiveness of powder of the cyclic PAS which is a cyclic oligomer may cause poor conveyance.

A production method of cyclic PAS by melting cyclic PAS by heating to an amorphous form has been disclosed as a method of recovery of cyclic PAS other than the powdery recovery method having the above problems. That method dissolves a cyclic PAS having high crystallinity and low solubility to convert the cyclic PAS into an amorphous form and cools down and solidifies the cyclic PAS in the amorphous form for recovery. That method is expected to enhance the solubility of the cyclic PAS and thereby improve the ease of handling. With respect to the cyclic PAS obtained by that method, however, there is no disclosure on the gas generation amount which is important in melt processing or on the weight reduction ratio. There is also no description on the ease of handling during the molding process other than the solubility or on pelletization. The description only regards the solubility of cyclic PAS (for example, JP 2010-018733 A).

It could therefore be helpful to provide a production method of a polyarylene sulfide having a narrow molecular weight distribution, low gas generation and high industrial usability without employing a process of increasing the purity by purification of a cyclic polyarylene sulfide using a solvent or a complicated process of increasing the molecular weight such as oxidative crosslinking by heating of a polyarylene sulfide after polymerization, as well as to provide a cyclic polyarylene sulfide pellet having excellent handling characteristics such as ease of conveyance and high molding processability, low gas generation and high industrial usability and a production method of such pellet.

SUMMARY

We thus provide:
1. A production method of polyarylene sulfide, comprising heating a cyclic polyarylene sulfide composition (a) which comprises not less than 50% by weight of a cyclic polyarylene sulfide expressed by Formula (1):

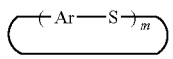

(1)

(where Ar represents an arylene group and m is an integral number of 4 to 50, wherein the cyclic polyarylene sulfide may be a mixture of plural different cyclic polyarylene sulfides having different numbers m),
the production method of polyarylene sulfide comprising:
a process (I) of heating, under reduced pressure, the cyclic polyarylene sulfide composition (a) having not less than 1.0% of a weight reduction ratio ΔWr(a) under heating given by Equation (2), thus obtaining a cyclic polyarylene sulfide composition (b) which has less than 50% of a reduction ratio of the cyclic polyarylene sulfide to the cyclic polyarylene sulfide composition (a) and has less than 1.0% of a weight reduction ratio ΔWr(b) under heating given by Equation (2), $$\Delta Wr(x)=(W1-W2)/W1\times 100\% \quad (2)$$

(where ΔWr(x) denotes a weight reduction ratio (%) of a material (x) and is obtained from a sample weight (W2) at temperature reaching 330° C. relative to a sample weight (W1) at temperature reaching 200° C. in thermogravimetric analysis in a non-oxidizing atmosphere under ordinary pressure with increasing temperature from 50° C. to any temperature of not lower than 330° C. at a temperature rise rate of 20° C./minute); and
a process (II) of heating the cyclic polyarylene sulfide composition (b), thus obtaining a polyarylene sulfide (c) which has not less than 50% of the reduction ratio of the cyclic polyarylene sulfide to the cyclic polyarylene sulfide composition (a) and has a weight-average molecular weight of not less than 10,000.

2. The production method of the cyclic polyarylene sulfide according to aspect 1, wherein the weight reduction ratio ΔWr(b) of the cyclic polyarylene sulfide composition (b) obtained in the process (I) is less than 0.5%.

3. The production method of the cyclic polyarylene sulfide according to either aspect 1 or aspect 2, wherein the process (I) and the process (II) perform heating in a non-oxidizing atmosphere.

4. The production method of the cyclic polyarylene sulfide according to any one of aspects 1 to 3, wherein a heating temperature in the process (I) is not lower than a melting temperature of the cyclic polyarylene sulfide composition (a) and not higher than 300° C.

5. The production method of the cyclic polyarylene sulfide according to any one of aspects 1 to 4, wherein a heating temperature in the process (II) is not lower than a melting temperature of the cyclic polyarylene sulfide composition (b).

6. The production method of the cyclic polyarylene sulfide according to any one of aspects 1 to 5, wherein the process (II) heats the cyclic polyarylene sulfide composition (b) under a solvent-free condition.

7. The production method of the cyclic polyarylene sulfide according to any one of aspects 1 to 6, wherein the production method performs the process (II) after pelletizing the cyclic polyarylene sulfide composition (b) obtained in the process (I).

8. A cyclic polyarylene sulfide pellet comprised of a cyclic polyarylene sulfide composition (p),
wherein the cyclic polyarylene sulfide composition (p) comprises not less than 50% by weight of a cyclic polyarylene sulfide expressed by Formula (1):

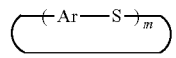

(1)

(where Ar represents an arylene group and m is an integral number of 4 to 50, wherein the cyclic polyarylene sulfide may be a mixture of plural different cyclic polyarylene sulfides having different numbers m), and
the cyclic polyarylene sulfide composition (p) has less than 1.0% of a weight reduction ratio ΔWr(p) under heating given by Equation (2), $$\Delta Wr(x)=(W1-W2)/W1\times 100\% \quad (2)$$

(where ΔWr(x) denotes a weight reduction ratio (%) of a material (x) and is obtained from a sample weight (W2) at temperature reaching 330° C. relative to a sample weight (W1) at temperature reaching 200° C. in thermogravimetric analysis in a non-oxidizing atmosphere under ordinary pressure with increasing temperature from 50° C. to any temperature of not lower than 330° C. at a temperature rise rate of 20° C./minute).

9. The cyclic polyarylene sulfide pellet according to aspect 8, wherein when the cyclic polyarylene sulfide pellet is vibrated on a 20-mesh sieve (aperture of 0.833 mm) for 2 minutes or longer using a vibrating sieve, a residue on the sieve is not less than 95% by weight.

10. The cyclic polyarylene sulfide pellet according to either aspect 8 or aspect 9, wherein the cyclic polyarylene sulfide composition (p) is obtained by heating, under reduced pressure, a cyclic polyarylene sulfide composition (a) which comprises not less than 50% by weight of a cyclic polyarylene sulfide expressed by Formula (1) and has not less than 1.0% of a weight reduction ratio ΔWr(a) under heating given by Equation (2), and the cyclic polyarylene sulfide composition (p) has less than 50% of a reduction ratio of the cyclic polyarylene sulfide to the cyclic polyarylene sulfide composition (a).

11. A production method of cyclic polyarylene sulfide pellet, comprising the step of:
pelletizing a cyclic polyarylene sulfide composition (b) which comprises not less than 50% by weight of a cyclic polyarylene sulfide expressed by Formula (1):

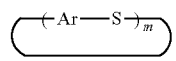

(1)

(where Ar represents an arylene group and m is an integral number of 4 to 50, wherein the cyclic polyarylene sulfide may be a mixture of plural different cyclic polyarylene sulfides having different numbers m) and has less than 1.0% of a weight reduction ratio ΔWr(b) under heating given by Equation (2), $$\Delta Wr(x)=(W1-W2)/W1\times 100\% \quad (2)$$

(where ΔWr(x) denotes a weight reduction ratio (%) of a material (x) and is obtained from a sample weight (W2) at temperature reaching 330° C. relative to a sample weight (W1) at temperature reaching 200° C. in thermogravimetric analysis in a non-oxidizing atmosphere under ordinary pressure with increasing temperature from 50° C. to any temperature of not lower than 330° C. at a temperature rise rate of 20° C./minute).

12. The production method of cyclic polyarylene sulfide pellet according to aspect 11, wherein the pelletizing step drops the cyclic polyarylene sulfide composition (b) in a molten state as droplets and subsequently cools down the cyclic polyarylene sulfide composition (b) to obtain the pellet.

We provide a production method of the polyarylene sulfide that has a narrow molecular weight distribution, low gas generation and high industrial usability without employing a process of increasing the purity by purification of a cyclic polyarylene sulfide using a solvent or a complicated process of increasing the molecular weight such as oxidation by heating of a polyarylene sulfide. We also provide a cyclic polyarylene sulfide pellet having ease of conveyance, excellent molding processability, low gas generation and high industrial usability and the production method of such pellet.

DETAILED DESCRIPTION

The following describes examples of our methods, compositions and pellets.

Cyclic Polyarylene Sulfide Composition (a)

A cyclic polyarylene sulfide composition (a) may be used as the raw material to produce a polyarylene sulfide (c) which is a highly-polymerized polymer by conversion (polymerization) of cyclic PAS described below. The cyclic PAS composition (a) may be a cyclic PAS mixture including 50% by weight or more of cyclic PAS expressed by Formula (A) below.

The cyclic PAS is here described in detail. The cyclic PAS may be a cyclic compound having a repeating unit expressed by a formula —(Ar—S)— as the basic structural unit and is a compound preferably containing 80 mol % or more of this repeating unit as expressed by Formula (A):

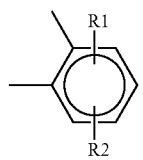

(A)

(where Ar represents an arylene group).

Here, Ar may be, for example, any of units expressed by Formulae (B) to (M). Among them, Formulae (B) to (D) are preferable; Formulae (B) and (C) are more preferable; and Formula (B) is especially preferable.

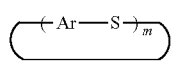

(B)

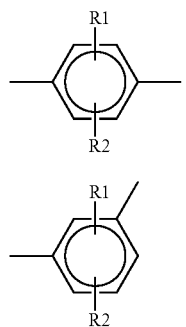

(C)

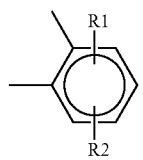

(D)

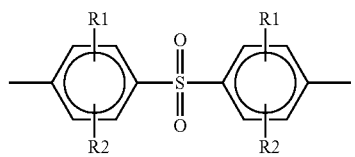

(E)

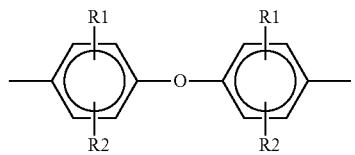

(F)

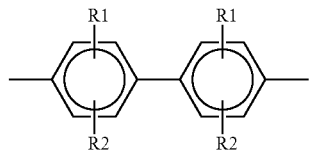

(G)

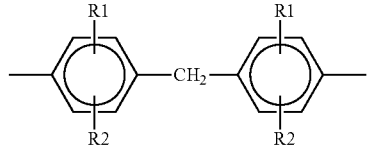

(H)

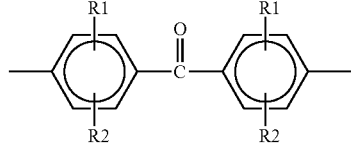

(I)

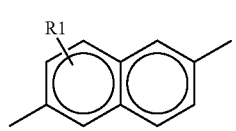

(J)

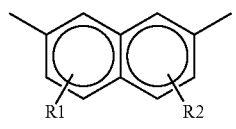

(K)

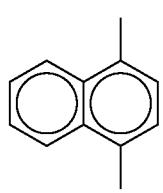

(L)

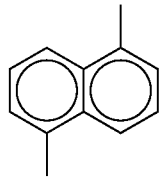

(M)

(where each of R1 and R2 in the formulae represents a substituent selected from the group consisting of hydrogen, 1 to 6 carbon atom-containing alkyl groups, 1 to 6 carbon atom-containing alkoxy groups and halogen groups, and R1 and R2 may be identical with each other or may by different from each other.)

The cyclic PAS may be a random copolymer, a block copolymer or a mixture thereof having the repeating unit including the arylene group expressed by any of the above Formulae (B) to (M). Typical examples of such cyclic PAS include cyclic polyphenylene sulfides, cyclic polyphenylene sulfide sulfones, cyclic polyphenylene sulfide ketones and their cyclic random copolymers, cyclic block copolymers and mixtures thereof. An especially preferable example of the cyclic PAS is a cyclic polyphenylene sulfide (hereinafter may be abbreviated as cyclic PPS) containing 80 mol % or more or specifically containing 90 mol % or more of the following p-phenylene sulfide unit as the basic structural unit.

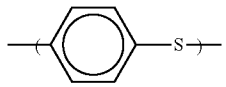

The repeating number m in Formula (A) of the cyclic PAS is 4 to 50, is preferably 4 to 25 and is more preferably 4 to 20. The cyclic PAS having m in this range is likely to decrease the flow temperature when being molten and is thus advantageous in decreasing the processing temperature during the molding process of the cyclic PAS or during melt kneading of the cyclic PAS with another resin. It is unpractical to produce the cyclic PAS having m of less than 4. The repeating number m of greater than 50, on the other hand, is likely to make the properties of the cyclic PAS close to the properties of linear PAS. The cyclic PAS having the larger m is likely to be more easily crystallized and have the higher flow temperature when being molten than the cyclic PAS having the smaller m.

The cyclic PAS composition (a) may be a cyclic PAS mixture including 50% by weight or more, preferably 60% by weight or more or more preferably 70% by weight or more of the cyclic PAS expressed by the above Formula (A).

The upper limit of the cyclic PAS included in the cyclic PAS mixture is not specifically restricted but is preferably not greater than 98% by weight, is more preferably not greater than 95% by weight and is furthermore preferably not greater than 90% by weight. It is especially preferable that a compound other than the cyclic PAS included in the cyclic PAS mixture is a linear PAS described later.

In general, the higher content of the cyclic PAS in the cyclic PAS composition (a) is more likely to increase the molecular weight of a resulting PAS obtained after heating in the process of producing the PAS by a production method described later using the cyclic PAS composition (a).

Accordingly, the molecular weight of the resulting PAS is readily adjustable by controlling the content of the cyclic PAS in the cyclic PAS composition (a). In other words, the molecular weight of the resulting PAS depends on the content of the cyclic PAS in the cyclic PAS composition (a) as the raw material. There is thus generally a need to purify the cyclic PAS composition (a) to the higher purity, in order to produce PAS of the higher molecular weight. The prior art employs, for example, extraction purification using an organic solvent, in order to obtain the high purity of cyclic PAS. This prior art tends to need the more labor and the more energy. Our production method, however, enables a high molecular weight of PAS to be readily produced without the need of the complicated purification process which is required in the prior art for purification using an organic solvent.

A composition of extremely high purity having the content of the cyclic PAS in the cyclic PAS composition (a) that is greater than 98% by weight mentioned above is, however, likely to increase the melting temperature of the cyclic PAS composition (a). Controlling the content of the cyclic PAS to the above range thus advantageously lowers the temperature during the process of producing the higher molecular weight of the cyclic PAS composition (a).

The content of the cyclic PAS in the cyclic PAS composition (a) of less than 50% by weight, on the other hand, undesirably results in producing only a lower molecular-weight product of PAS(c) having the weight-average molecular weight of less than 10,000 in a process (II) described later.

The content of the cyclic PAS in the cyclic PAS composition (a) may be determined, for example, by high-performance liquid chromatography analysis.

The cyclic PAS composition (a) may have a weight reduction ratio $\Delta Wr(a)$ of not less than 1.0% in thermogravimetric analysis in a non-oxidizing atmosphere with increasing temperature from 50° C. to any temperature of not lower than 330° C. at a temperature rise rate of 20° C./minute. The above weight reduction ratio $\Delta Wr(a)$ under heating specifically denotes a value of reduction of a sample weight (W2) at temperature reaching 330° C. relative to a sample weight (W1) at temperature reaching 200° C. and is shown by Equation (3) below:

$$\Delta Wr(a) = (W1 - W2)/W1 \times 100\% \quad (3).$$

The upper limit of the above weight reduction ratio $\Delta Wr(a)$ under heating is not specifically restricted but is preferably a range of not greater than 10%.

The above ratio $\Delta Wr(a)$ of less than 1.0% is undesirably likely to interfere with the advantageous effects of the production method, i.e., the advantageous effects such as production of the cyclic PAS composition (b) of the higher purity, reduction of the gas generation amount during the molding process, reduction of deposits on a spinneret or a die during extrusion molding or on a mold during injection molding, thus improving the productivity, as well as the excellent advantageous effects such as production of the PAS (c) of the higher molecular weight compared to the case that does not employ our method.

There is a concern that the presence of a component other than cyclic PAS in the cyclic PAS composition (a) may act as a contaminant or a by-product and cause adverse effects on the mechanical properties, the heat resistance, the low gas generation and on increasing the molecular weight. To not interfere with the advantageous effects, it is especially preferable that the component other than the cyclic PAS included in the cyclic PAS composition (a) is a linear PAS oligomer. Here, the linear PAS oligomer has the repeating unit expressed by the formula —(Ar—S)— as the basic structural unit and is a linear homo-oligomer or co-oligomer preferably containing 80 mol % or more of this repeating unit. Ar may be any of the units expressed by the above Formulae (B) to (M). Among them, the Formula (B) is especially preferable. The linear PAS oligomer may include a small amount of a branch unit or a cross-linking unit, for example, expressed by any of Formulae (N) to (P) below, as long as having this repeating unit as the basic structural unit. The copolymerization amount of such branch unit or cross-linking unit is preferably in the range of 0 to 1 mol % relative to 1 mol of the —(Ar—S)— unit.

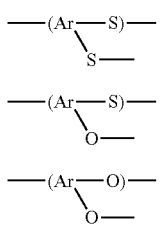

The linear PAS oligomer may be a random copolymer, a block copolymer or a mixture thereof including the above repeating unit.

Typical examples of such linear PAS oligomer include linear polyphenylene sulfide oligomers, linear polyphenylene sulfide sulfone oligomers, linear polyphenylene sulfide ketone oligomers and their random copolymers, block copolymers and mixtures thereof. An especially preferable example of the linear PAS oligomer is a linear polyphenylene sulfide oligomer containing 80 mol % or more or especially preferably containing 90 mol % or more of p-phenylene sulfide unit as the basic structural unit of the oligomer.

The molecular weight of the linear PAS oligomer may be a lower molecular weight than that of PAS. More specifically, the molecular weight of the linear PAS oligomer is preferably less than 10,000, is more preferably less than 5,000 and is furthermore preferably less than 2,500 as the weight-average molecular weight. The lower limit is, on the other hand, preferably not less than 200 and is more preferably not less than 300 as the weight-average molecular weight.

The upper limit of the molecular weight of the cyclic PAS composition (a) used for production of the PAS (c) is preferably not greater than 10,000, is more preferably not greater than 5,000 and is furthermore preferably not greater than 3,000 as the weight-average molecular weight. The lower limit is, on the other hand, preferably not less than 300, is more preferably not less than 400 and is furthermore preferably not less than 500 as the weight-average molecular weight.

The cyclic PAS composition (a) used for production of the PAS (c) may be a mixture including 50% by weight or more of cyclic PAS as described above. The method of preparing such cyclic PAS is not specifically limited. For example, the cyclic PAS obtained by the prior art described above may be used. The cyclic PAS may be produced by the following method disclosed in, for example, WO 2007/034800.

Specifically, the available method heats a mixture containing at least a polyhalogenated aromatic compound, a sulfidizing agent and an organic polar solvent to polymerize a PAS resin. The method subsequently removes the organic polar solvent by a known technique after completion of polymerization to prepare a mixture including the PAS resin, water and an alkali metal halide and purifies the mixture by a known technique to obtain a PAS resin including cyclic PAS. The method then makes this PAS resin subjected to extraction using a solvent which does not substantially dissolve the PAS resin but dissolves the cyclic PAS, and recovers a cyclic PAS mixture.

(2) Linear Polyarylene Sulfide Oligomer

The linear PAS oligomer contained in the cyclic PAS composition (a) described above has the repeating unit expressed by the formula —(Ar—S)— as the basic structural unit and is a linear homo-oligomer or a linear co-oligomer preferably containing 80 mol % or more of this repeating unit. Ar may be any of the units expressed by the above Formulae (B) to (M).

Among them, the Formulae (B) to (D) are preferable; the Formulae (B) and (C) are more preferable; and the Formula (B) is especially preferable.

The linear PAS oligomer may include a small amount of a branch unit or a cross-linking unit, for example, expressed by any of the above Formulae (N) to (P), as long as having this repeating unit as the basic structural unit. The copolymerization amount of such branch unit or cross-linking unit is preferably in the range of 0 to 1 mol % relative to 1 mol of the —(Ar—S)— unit.

The linear PAS oligomer may be a random copolymer, a block copolymer or a mixture thereof including the above repeating unit.

Typical examples of such linear PAS oligomer include linear polyphenylene sulfide oligomers, linear polyphenylene sulfide sulfone oligomers, linear polyphenylene sulfide ketone oligomers and their random copolymers, block copolymers and mixtures thereof. An especially preferable example of the linear PAS oligomer is a linear polyphenylene sulfide oligomer containing 80 mol % or more or especially preferably containing 90 mol % or more of p-phenylene sulfide unit given below as the basic structural unit of the oligomer:

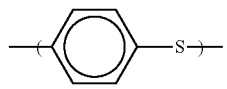

The molecular weight of any of the above various linear PAS oligomers is not specifically limited. The compound other than the cyclic PAS in the cyclic PAS composition (a) is especially preferably the linear PAS oligomer as described above. The weight-average molecular weight of the linear PAS oligomer included with the cyclic PAS is preferably not less than 200 and is especially preferably not less than 300. The weight-average molecular weight of the linear PAS oligomer included with the cyclic PAS is also preferably less than 10,000 is more preferably not greater than 5,000 and is especially preferably not greater than 2,500.

Additionally, a cyclic compound is generally produced by a competing reaction of production of the cyclic compound as the target with production of a linear compound. The method intended to produce a cyclic PAS produces a considerable amount of a linear PAS as a by-product other than the cyclic PAS as the target. Accordingly, production of the cyclic PAS is likely to cause a considerable amount of the linear PAS as the by-product to be mixed with the cyclic PAS. In most cases, there is a need to control extremely strict purification conditions to isolate only the cyclic PAS. The cyclic PAS composition (a) may be a mixture including 50% by weight or more of the cyclic PAS. Using such mixture is an economically advantageous method, in terms of no need to control the extremely strict purification conditions.

(3) Cyclic Polyarylene Sulfide Composition (b)

A cyclic PAS composition (b) in the production method of the PAS (c) denotes a cyclic PAS composition obtained by a process (I) that heats the cyclic PAS composition (a) under reduced pressure. The process (I) preferably employs conditions to suppress the progress of polymerization of cyclic PAS. Employing such conditions is likely to achieve the excellent advantageous effects, e.g., production of the cyclic PAS composition (b) of the higher purity and production of the PAS (c) of the higher molecular weight, compared to the case that does not employ our production method. Accordingly, the reduction ratio which is a ratio of the amount of the cyclic PAS in the cyclic PAS composition (b) to the amount of cyclic PAS in the cyclic PAS composition (a) is preferably less than 50%, is more preferably less than 40% and is furthermore preferably less than 30%. Here, the reduction ratio of the cyclic PAS is calculated as a weight ratio of the cyclic PAS in the cyclic PAS composition (b) to the cyclic PAS in the cyclic PAS composition (a). In other words, the reduction ratio of the cyclic PAS is a value showing how much reduction the cyclic PAS content of the cyclic PAS composition (b) per unit weight has relative to the cyclic PAS content of the cyclic PAS composition (a) per unit weight. The above reduction ratio of the cyclic PAS may be calculated, for example, based on the cyclic PAS content obtained by high-performance liquid chromatography analysis.

The reduction ratio of the cyclic PAS exceeding the above range causes polymerization to proceed without sufficient advantageous effects in the process (I) and is thus unlikely to produce the PAS (c) of the higher molecular weight and achieve the effects such as the low gas generation, compared to the case that includes the process (I). The embodiment performs the heating process (I) under reduced pressure and thus generally makes the reduction ratio of the above cyclic PAS to be not less than 0%.

The cyclic PAS composition (b) may have a weight reduction ratio ΔWr(b) of preferably less than 1.0% or more preferably less than 0.5% in thermogravimetric analysis in a non-oxidizing atmosphere with increasing temperature from 50° C. to any temperature of not lower than 330° C. at a temperature rise rate of 20° C./minute. The above weight reduction ratio ΔWr(b) under heating specifically denotes a value of reduction of a sample weight (W2) at temperature reaching 330° C. relative to a sample weight (W1) at temperature reaching 200° C. and is shown by Equation (4) below:

$$\Delta Wr(b)=(W1-W2)/W1\times 100\% \quad (4)$$

The above ratio ΔWr(b) of not less than 1.0% is undesirably likely to interfere with the advantageous effects such as production of the cyclic PAS composition (b) of the higher purity, reduction of the gas generation amount during the molding process, reduction of deposits on a spinneret or a die during extrusion molding or on a mold during injection molding, thus improving the productivity, as well as the excellent advantageous effects such as production of the PAS (c) of the higher molecular weight compared with the case that does not employ our production method. The lower limit of the above weight reduction ratio ΔWr(b) under heating is not specifically restricted, but the weight reduction ratio ΔWr(b) is generally not less than 0.001%.

Additionally, the cyclic PAS composition (b) includes preferably 50% by weight or more, more preferably 60% by weight or more and furthermore preferably 70% by weight or more of the cyclic PAS expressed by the above Formula (A). The upper limit of the cyclic PAS included in the cyclic PAS composition (b) is not specifically restricted but is, for example, not greater than 98% by weight, preferably not greater than 95% by weight and more preferably not greater than 90% by weight. Here, it is especially preferable that the compound other than the cyclic PAS in the cyclic PAS mixture is the linear PAS oligomer described above. The above content may be determined, for example, by high-performance liquid chromatography analysis.

The higher content of the cyclic PAS in the cyclic PAS composition (b) is generally more likely to increase the molecular weight of the resulting PAS (c) obtained after a process (II) described later. Accordingly, the molecular weight of the resulting PAS is readily adjustable by controlling the content of the cyclic PAS included in the cyclic PAS composition (a) as the raw material or in the cyclic PAS composition (b). In other words, the molecular weight of the resulting PAS depends on the content of the cyclic PAS in the cyclic PAS composition (a) as the raw material or in the cyclic PAS composition (b). There is thus generally a need to purify the cyclic PAS composition (a) to the higher purity to produce PAS of the higher molecular weight. The prior art employs, for example, extraction purification using an organic solvent, in order to obtain the high purity of cyclic PAS. This prior art tends to need more labor and more energy. Our production method, however, enables a high molecular weight of PAS to be readily produced without the need of the complicated purification process which is required in the prior art for purification using an organic solvent.

When the cyclic PAS included in the cyclic PAS composition (a) as the raw material is not less than 50% by weight and when the reduction ratio of the cyclic PAS in the process (I) is less than 50%, it is construed that the content of the cyclic PAS in the cyclic PAS composition (b) obtained in the process (I) meets the above range.

When the content of the cyclic PAS in the cyclic PAS composition (b) is less than 50% by weight, on the other hand, it would appear that the cyclic PAS in the cyclic PAS composition (b) is removed from the system due to some cause or polymerization proceeds to decrease the cyclic PAS. Removal of the cyclic PAS in the cyclic PAS composition (b) from the system undesirably results in producing only a lower molecular-weight product of PAS(c) having the weight-average molecular weight of less than 10,000 after the process (II) described later. The content of the cyclic PAS becoming less than 50% by weight due to the progress of polymerization is unlikely to produce the PAS of the higher molecular weight after the process (II) descried later, compared with the content of the cyclic PAS of not less than 50% by weight.

The content of the cyclic PAS in the cyclic PAS composition (b) may be determined, for example, by high-performance liquid chromatography analysis.

The upper limit of the molecular weight of the cyclic PAS composition (b) used for production of the PAS (c) is preferably not greater than 10,000, is more preferably not greater than 5,000 and is furthermore preferably not greater than 3,000 as the weight-average molecular weight. The lower limit is, on the other hand, preferably not less than 300, is more preferably not less than 400 and is furthermore preferably not less than 500 as the weight-average molecular weight.

(4) Polyarylene Sulfide (c)

The PAS (c) may have the repeating unit expressed by the formula —(Ar—S)— as the basic structural unit and is a homo-polymer or a copolymer preferably containing 80 mol % or more of this repeating unit. Ar may be any of the units expressed by the above Formulae (B) to (M). Among them, the Formula (B) is especially preferable.

The PAS (c) may include a small amount of a branch unit or a cross-linking unit, for example, expressed by any of the above Formulae (N) to (P), as long as having this repeating unit as the basic structural unit. The copolymerization amount of such branch unit or cross-linking unit is preferably 0 to 1 mol % relative to 1 mol of the —(Ar—S)— unit.

The PAS (c) may be a random copolymer, a block copolymer or a mixture thereof including the above repeating unit. Typical examples of such PAS (c) include polyphenylene sulfides, polyphenylene sulfide sulfones, polyphenylene sulfide ketones and their random copolymers, block copolymers and mixtures thereof. An especially preferable example of the PAS (c) is a polyphenylene sulfide containing 80 mol % or more or especially preferably containing 90 mol % or more of p-phenylene sulfide unit as the basic structural unit of the polymer.

The dispersion of the molecular weight distribution of the PAS (c) obtained, i.e., the polydispersity indicated by the ratio of the weight-average molecular weight to the number-average molecular weight (weight-average molecular weight/number-average molecular weight) is preferably not greater than 2.5, is more preferably not greater than 2.3, is furthermore preferably not greater than 2.1 and is especially preferably not greater than 2.0. The polydispersity of not greater than 2.5 is more likely to reduce the amount of low molecular weight components included and preferably reduces the possibilities of deteriorating the mechanical properties in application of the PAS for molding process, increasing the gas generation amount during heating and increasing the amount of elution components generated by exposure to a solvent. The above weight-average molecular weight and number-average molecular weight may be determined, for example, by SEC (size exclusion chromatography) with a differential refractive index detector.

In terms of reducing the environmental load, the PAS (c) preferably has the less content of chlorine atom. The prior art production method uses p-dichlorobenzene as the raw material, so that the PAS obtained by the prior art production method is likely to have a large content of chlorine atom. Marketed PAS products generally have the chlorine content of 2000 to 4000 ppm. Our PAS (c), on the other hand, is produced from the cyclic PAS composition (a) used as the main raw material. Our production method has the advantage of the less chlorine-containing low molecular weight products in the process (I). The PAS (c) obtained by our production method is thus more likely to have the chlorine atom content of not greater than 2000 ppm. Such reduction of the chlorine atom content in the PAS is desirable, for example, in application of the PAS for electric and electronic components.

It is preferable that the PAS (c) does not substantially contain a halogen other than chlorine, i.e., fluorine, bromine, iodine or astatine. Containing a halogen other than chlorine is likely to deteriorate the properties of the PAS, for example, the electrical properties and the melt stability, due to the specific characteristics of the halogen.

The PAS (c) preferably has the weight reduction ratio of not greater than 0.2% at temperatures of 100° C. to 330° C. in thermogravimetric analysis in a non-oxidizing atmosphere under ordinary pressure with increasing temperature from 50° C. to any temperature of not lower than 330° C. at a temperature rise rate of 20° C./minute. The prior art production method of PAS performs polymerization at high temperature using a solvent. The resulting PAS accordingly includes a significant amount of solvent-derived compounds (for example, N-methylpyrrolidone generally used as the solvent and γ-butyrolactone as its raw material) and terminal thermolysis products and is thus likely to have the above weight reduction ratio of not less than 0.2%. Our PAS (c), on the other hand, performs polymerization of the cyclic PAS composition as the raw material without using a solvent. In this case, the resulting PAS does not substantially include low molecular weight compounds, such as solvent-derived compounds and terminal thermolysis products. The process (I) employs the condition of reduced pressure during melting and is thus more likely to further reduce the above weight reduction ratio under heating. Additionally, the above weight reduction ratio of the PAS (c) is preferably not greater than 0.18%, is more preferably not greater than 0.12% and is furthermore preferably not greater than 0.1%. The weight reduction ratio of not greater than 0.2% is likely to achieve the favorable effects such as reduction of the gas generation amount during the molding process of the PAS and reduction of deposits on a spinneret or a die during extrusion molding or on a mold during injection molding, which is expected to improve the productivity.

The weight-average molecular weight of the PAS (c) is not less than 10,000, is preferably not less than 15,000 and is more preferably not less than 18,000. The weight-average molecular weight of less than 10,000 causes the low moldability during processing and the deteriorating properties of a resulting molded product such as the mechanical strength and the chemical resistance. The upper limit of the weight-average molecular weight is not specifically restricted, but is, for example, preferably less than 1,000,000, more preferably less than 500,000 and furthermore preferably less than 200,000. The weight-average molecular weight in this range ensures the high molding processability.

(5) Production Method of Polyarylene Sulfide (c)

The production method of the polyarylene sulfide (c) is a production method of PAS characterized by heating the cyclic PAS composition (a) including 50% by weight or more of the cyclic PAS expressed by Formula (A) and is specifically a production method of PAS (c) including the process (I) and the process (II) described below.

Process (I)

The process (I) heats the cyclic PAS composition (a) having the weight reduction ratio $\Delta Wr(a)$ under heating expressed by Equation (3) discussed above of not less than 1.0%, under reduced pressure, so as to obtain the cyclic PAS composition (b) having the reduction ratio of the cyclic PAS to the cyclic PAS composition (a) of less than 50% and the weight reduction ratio $\Delta Wr(b)$ expressed by Equation (4) discussed above of less than 1.0%.

The heating temperature of the cyclic PAS composition (a) in the process (I) is preferably not lower than the melting temperature of the cyclic PAS composition (a) and is not specifically limited as long as the heating temperature meets the temperature condition of obtaining the cyclic PAS composition (b) having the weight reduction ratio $\Delta Wr(b)$ under heating of less than 1.0%. The melting temperature of the cyclic PAS composition (a) changes depending on the formulation of the cyclic PAS composition (a), the atmosphere and the pressure under heating and the heating time and is thus not unequivocally specifiable. For example, the melting temperature may be detected by differential scanning calorimetry analysis of the cyclic PAS composition (a). The amount of the sample for measurement by differential scanning calorimetry is preferably about 10 mg. The sample geometry is desirably fine particle or powder of not greater than about 2 mm in diameter.

The lower limit of the heating temperature is, for example, not lower than 210° C., is preferably not lower than 220° C. and is more preferably not lower than 240° C. This temperature range desirably causes the cyclic PAS composition (a) to be melted and is likely to achieve the advantageous effects. The excessively high temperature, on the other hand, causes polymerization to proceed without achieving the sufficient advantageous effects. The upper limit of the preferable heating temperature changes depending on the formulation of the cyclic PAS composition (a), the heating environment and the heating time and is thus not unequivocally specifiable. The upper limit of the preferable heating temperature may be any heating temperature that causes the cyclic PAS composition (b) obtained by heating the cyclic PAS composition (a) under reduced pressure to have the reduction ratio of the cyclic PAS to the cyclic PAS composition (a) of less than 50%, more preferably less than 40% or furthermore preferably less than 30%. The upper limit of the heating temperature is also any heating temperature that causes the above cyclic PAS composition (b) to have the weight reduction ratio ΔWr(b) under heating of less than 1.0%. The upper limit of the above heating temperature is, for example, not higher than 340° C., is preferably not higher than 320° C. and is more preferably not higher than 300° C. as the temperature range expected to ensure the advantageous effects. In this temperature range, the cyclic PAS composition (a) is more likely to be melted, and the resulting cyclic PAS composition (b) has the weight reduction ratio ΔWr(b) under heating of less than 1.0%. This temperature range desirably reduces the gas generation amount during the molding process of the cyclic PAS composition (b) and is likely to reduce deposits on a spinneret or a die during extrusion molding or on a mold during injection molding, thus improving the productivity.

The heating time of the cyclic PAS composition (a) in the process (I) changes depending on the formulation of the cyclic PAS composition (a), the atmosphere under heating and the heating temperature and is thus not unequivocally specifiable. The heating time may be any heating time that causes the cyclic PAS composition (b) obtained by heating the cyclic PAS composition (a) under reduced pressure to have the reduction ratio of the cyclic PAS to the cyclic PAS composition (a) of less than 50%, more preferably less than 40% or furthermore preferably less than 30%. The above heating time is, for example, not shorter than 0.05 hours, is preferably not shorter than 0.1 hours and is more preferably not shorter than 0.5 hours as the time range that ensures the sufficient advantageous effects. The above heating time is also, for example, shorter than 20 hours, is preferably shorter than 15 hours and is more preferably shorter than 10 hours as the time range that ensures the sufficient advantageous effects.

The reduction ratio of the cyclic PAS is calculated as the ratio of the cyclic PAS content per unit weight in the cyclic PAS composition (b) to the cyclic PAS content per unit weight in the cyclic PAS composition (a) and indicates how much the cyclic PAS content is decreased relative to the cyclic PAS in the cyclic PAS composition (a) as described above. The reduction ratio of the cyclic PAS exceeding the above range causes polymerization to proceed without achieving the sufficient effects in the process (I). This is thus unlikely to achieve the expected advantageous effects such as production of PAS of the higher molecular weight and the low gas generation.

The atmosphere during heating of the cyclic PAS composition (a) in the process (I) is preferably a non-oxidizing atmosphere. Any of the reduced pressure condition, the ordinary pressure condition and the pressurized condition may be employed as the pressure condition for heating. It is, however, necessary to employ the reduced pressure condition in some stage of heating. The pressure condition to be employed is preferably heating under ordinary pressure in the initial stage of heating and changing to the reduced pressure in the middle, is more preferably heating under reduced pressure in the initial stage of heating and changing to the ordinary pressure in the middle, and is most preferably heating under reduced pressure from the initial stage to the terminal stage of heating. In any pressure condition, it is preferable to change the atmosphere in the reaction system to a non-oxidizing atmosphere and subsequently reduce the pressure. This is likely to suppress the occurrence of undesired side reactions, such as cross-linking reaction and decomposition reaction of the PAS composition.

The non-oxidizing atmosphere is an atmosphere having the oxygen concentration of not higher than 5% by volume, is preferably an atmosphere having the oxygen concentration of not higher than 2% by volume or is furthermore preferably a substantially oxygen-free atmosphere in the gas phase which the PAS component is exposed to. More specifically the non-oxidizing atmosphere is an inert gas atmosphere of, for example, nitrogen, helium or argon. Among them, a nitrogen atmosphere is especially preferable in terms of the economic efficiency and the ease of handling. The ordinary pressure condition means the atmospheric pressure, and the pressurized condition means the higher pressure than the atmospheric pressure. The reduced pressure condition means that the pressure in the reaction system is lower than the atmospheric pressure. The upper limit of the reduced pressure is preferably not higher than 50 kPa, is more preferably not higher than 20 kPa and is furthermore preferably not higher than 10 kPa. The lower limit is not specifically restricted.

Process (II)

The process (II) heats the cyclic PAS composition (b) to obtain the PAS (c) having the reduction ratio of the cyclic PAS to the cyclic PAS composition (a) of not less than 50% and the weight-average molecular weight of not less than 10,000.

The heating temperature of the cyclic PAS composition (b) in the process (II) is preferably not lower than a temperature that melts the cyclic PAS composition (b) and causes polymerization to proceed. More specifically, the heating temperature is not specifically limited as long as it meets the temperature condition that obtains the PAS (c) having the reduction ratio of the cyclic PAS to the cyclic PAS composition (a) of not less than 50%. The melting temperature of the cyclic PAS composition (b) changes depending on the formulation of the cyclic PAS composition (b), the atmosphere and the pressure under heating and the heating time and is thus not unequivocally specifiable. For example, the melting temperature may be detected by differential scanning calorimetry analysis of the cyclic PAS composition (b). The amount of the sample for measurement by differential scanning calorimetry is preferably about 10 mg. The sample geometry is desirably fine particle or powder of not greater than about 2 mm in diameter.

The lower limit of the heating temperature in the process (II) changes depending on the formulation of the cyclic PAS composition (b), the atmosphere and the pressure under heating and the heating time and is thus not unequivocally specifiable. The heating temperature may be any heating temperature that causes the PAS (c) obtained by heating the cyclic PAS composition (b) to have the reduction ratio of the cyclic PAS to the cyclic PAS composition (a) of not less than 50%, more preferably not less than 70% or furthermore preferably not less than 80%. The above heating temperature is, for example, preferably not lower than 280° C. and is more preferably not lower than 300° C. This temperature range desirably melts the cyclic PAS composition (b) and enables polymerization to sufficiently proceed. The upper limit of the preferable heating temperature is, on the other hand, for example, not higher than 400° C., is preferably not higher than 380° C. and is more preferably not higher than 360° C. This temperature range is desirably likely to interfere with side reactions such as thermal decomposition and cross-linking.

The heating time of the cyclic PAS composition (b) in the process (II) changes depending on the formulation of the cyclic PAS composition (b), the atmosphere and the pressure under heating and the heating temperature and is thus not unequivocally specifiable. The heating time may be any heating time that causes the PAS (c) obtained by heating the cyclic PAS composition (b) to have the reduction ratio of the cyclic PAS to the cyclic PAS composition (a) in the range of not less than 50%, more preferably in the range of not less than 70% or furthermore preferably in the range of not less than 80%. The above heating time is, for example, 0.01 to 20 hours, is preferably 0.01 to 15 hours and is more preferably 0.01 to 10 hours. This temperature range is more likely to meet the requirement that the reduction ratio of the cyclic PAS is not less than 50% and can thus be specified as the condition of obtaining the PAS (c).

The reduction ratio of the cyclic PAS is calculated as the ratio of the cyclic PAS in the PAS (c) obtained by heating the cyclic PAS composition (b) to the cyclic PAS in the cyclic PAS composition (a) and indicates how much the cyclic PAS content is decreased relative to the cyclic PAS in the cyclic PAS composition (a) as described above. The reduction ratio of the cyclic PAS in the PAS (c) of less than the above range undesirably increases the gas generation amount of the resulting PAS and is more likely to cause the lower molecular weight and the poorer mechanical properties, compared with the reduction ratio of the cyclic PAS of not less than 50%.

The atmosphere during heating of the cyclic PAS composition (b) in the process (II) is preferably a non-oxidizing atmosphere. Any pressure condition, for example, pressurized condition, ordinary pressure condition, reduced pressure condition or condition of changing the pressure from the increased pressure or the ordinary pressure to the reduced pressure, may be employed for the pressure under heating. When employing the pressure condition accompanied with pressure reduction, it is preferable to change the atmosphere in the reaction system to the non-oxidizing atmosphere and subsequently reduce the pressure. This is likely to suppress the occurrence of undesired side reactions, such as cross-linking reaction and decomposition reaction. The non-oxidizing atmosphere and the reduced pressure condition are described above with regard to the process (I).

It is preferable that heating of the cyclic PAS composition (b) in the process (II) is performed under a substantially solvent-free condition. Such condition is likely to increase the temperature in a short time and give the high reaction rate, thus allowing for production of the PAS (c) in a short time. The substantially solvent-free condition denotes the condition that the solvent in the cyclic PAS composition (b) is not higher than 10% by weight and is more preferably not higher than 3% by weight.

The above heating in the process (II) may be performed using any device equipped with a heating mechanism without limitation, for example, using a mold to produce a molded product or using an extruder or a melt kneader, let alone using a general polymerization reactor. A known system, such as batch system or continuous system may be employed for such heating. The process (I) and the process (II) may be performed successively using an identical polymerization reactor or may be performed using different polymerization reactors. For example, an available procedure may transfer the reactant in the molten state from a heating device in the process (I) to a heating device in the process (II). Another available procedure may take out, cool down and recover the reactant after heating in the process (I) and again heat and melt the recovered reactant in a heating device in the process (II).

The above heating of the cyclic PAS composition (b) in the process (II) may be performed in the coexistence of a fibrous material. The fibrous material denotes a fine threadlike material and is preferably any material having the elongated structure like natural fiber. Conversion from the cyclic PAS to the PAS of the higher molecular weight in the presence of the fibrous material enables a composite material structure consisting of PAS and the fibrous material to be readily produced. This structure is reinforced with the fibrous material and is thus likely to have, for example, the better mechanical properties, compared to the PAS alone.

Among various fibrous materials, using long-fibered reinforcement fiber preferably allows for the high degree of reinforcement of PAS. The fibrous material is preferably the long-fibered reinforcement fiber as mentioned above. The reinforcement fiber is not specifically limited, but the reinforcement fiber preferably used is generally a fiber having high heat resistance and high tensile strength used as the high-performance reinforcement fiber. Examples of such reinforcement fiber include glass fibers, carbon fibers, graphite fibers, aramid fibers, silicon carbide fibers, alumina fibers and boron fibers. Among them, most preferable are carbon fibers and graphite fibers having the high specific strength and the high specific elastic modulus and having significant contribution to weight reduction. As for the carbon fibers and graphite fibers, any types of carbon fibers and graphite fibers may be used according to the application. Most suitable is high-strength, high-elongation carbon fiber having the tensile strength of not less than 450 kg/mm$^2$ and the tensile elongation of not less than 1.6%. In the case of using long-fibered reinforcement fiber, the length is preferably not less than 5 cm. This length range readily enables the strength of the reinforcement fiber to be sufficiently exerted as the composite material. The carbon fiber or the graphite fiber may be used as a mixture with another reinforcement fiber. The geometry or the array of the reinforcement fiber is not limited but may be, for example, unidirectional, random directional, sheet-like, mat-like, woven or braided. In applications that especially require the high specific strength and the high specific elastic modulus, a unidirectionally-aligned array of reinforcement fiber is most suitable. An easily handled cloth (woven) array is also suitable.

Additionally, the above conversion from the cyclic PAS to the PAS of the higher molecular weight in the process (II) may be performed in the presence of a filler. Available examples of the filler include non-fibrous glass, non-fibrous carbon and inorganic fillers such as calcium carbonate, titanium oxide and alumina.

Additives may be added in the molding process to such an extent that does not interfere: for example, thermal stabilizers, ultraviolet absorbers, infrared absorbers, organic pigments, inorganic pigments, fluorescent whitening agents, lubricants, mold release agents, flame retardants, antimicrobial agents, antistatic agents, nucleating agents, water repellents, anti-mold agents, deodorants and blocking inhibitors.

Similarly, another thermoplastic resin, a thermosetting resin or an elastomer may be used to be mixed in the molding process to such an extent that does not interfere. Examples of the thermoplastic resin include polyethylene, polypropylene, acrylic resin, polyamide, polyphenylene sulfide resin, polyether ether ketone resin, polyester, polysulfone, polyphenylene oxide, polyimide, polyether imide and polycarbonate. Examples of the thermosetting resin include phenolic resin, melamine resin, polyester resin, silicone resin, epoxy resin and urethane resin. Examples of the elastomer include polyolefin rubber, fluororubber and silicone rubber.

(6) Cyclic Polyarylene Sulfide Pellet

The cyclic PAS pellet is a pellet made of a cyclic PAS composition (p) which includes 50% by weight or more, preferably 60% by weight or more, or more preferably 70% by weight or more of the cyclic polyarylene sulfide expressed by Formula (1). The upper limit of the cyclic PAS included in the cyclic PAS composition (p) is not specifically restricted but is, for example, in the range of not greater than 98% by weight, preferably in the range of not greater than 95% by weight or more preferably in the range of not greater than 90% by weight. This cyclic PAS composition (p) has the weight reduction ratio ΔWr(p) of preferably less than 1.0% or more preferably less than 0.5% in thermogravimetric analysis in a non-oxidizing atmosphere with increasing temperature from 50° C. to any temperature of not lower than 330° C. at a temperature rise rate of 20° C./minute. The lower limit of the above weight reduction ratio ΔWr(p) is not specifically restricted, but the weight reduction ratio ΔWr(p) is generally not less than 0.001%. The above weight reduction ratio ΔWr(p) under heating specifically denotes a value of reduction of a sample weight (W2) at temperature reaching 330° C. relative to a sample weight (W1) at temperature reaching 200° C. and is shown by Equation (5) below:

$$\Delta Wr(p)=(W1-W2)/W1\times 100\% \qquad (5).$$

The cyclic PAS composition (p) which the pellet is made of may be the cyclic PAS composition (b) obtained in the process (I) described above. Pelletization using the cyclic PAS composition (b) obtained in the process (I) reduces the gas generation amount, compared with pelletization using the cyclic PAS composition (a). Pelletization using the cyclic PAS composition (b) preferably reduces the gas generation amount during the molding process and is likely to reduce deposits on a spinneret or a die during extrusion molding or on a mold during injection molding, thus improving productivity.

As described with reference to the specific examples in the Background section, the generally employed known cyclic PAS production method produces a cyclic PAS composition in the powdery form. We found the problem characteristic of cyclic PAS that the cyclic PAS composition powder is compacted in a screw feeder and fails to be conveyed in the course of feeding to an extruder using the screw feeder. More specifically, the cyclic PAS composition powder has poor conveyance, which causes the phenomenon that the cyclic PAS composition powder gradually accumulates in the screw feeder and is eventually compacted not to be conveyed. This interferes with taking advantage of the inherent characteristics of the cyclic PAS, i.e., low gas generation and improved melt processability and using the cyclic PAS composition powder by an industrially simple method. The cause of such compaction is not clear, but it is presumed that high affinity between rings and high cohesiveness of powder of the cyclic PAS which is a cyclic oligomer may cause poor conveyance. Our cyclic PAS pellet addresses the above problems of the prior art cyclic PAS composition powder and is characterized by the ease of conveyance, the excellent molding processability and the less gas generation amount.

The geometry of the pellet is not specifically limited but may be, for example, cylindrical, cuboid or spherical. More specifically, when 100 g of the pellet is vibrated on a 20-mesh sieve (aperture of 0.833 mm) or preferably on a 16-mesh sieve (aperture of 0.991 mm) for not less than 2 minutes but not greater than 10 minutes or preferably for 2 minutes using a vibrating sieve, a residue on the sieve is not less than 95% by weight or preferably not less than 97% by weight. The above residue on the sieve is generally not greater than 99.9% by weight.

The maximum length of the pellet is not specifically limited. The average maximum length of the pellet is preferably not less than 1 mm, is more preferably not less than 1.5 mm and is especially preferably not less than 2 mm. The average maximum length of the pellet is also preferably not greater than 50 mm, is more preferably not greater than 10 mm and is especially preferably not greater than 7 mm. A method of measuring the above average maximum length may select 20 pieces of the pellet at random, measure the maximum lengths of the selected pellet pieces using a vernier caliper or a micrometer and calculate an average of the measurement values.

(7) Production Method of Cyclic Polyarylene Sulfide Pellet

A method applicable to obtain the cyclic PAS pellet drops the cyclic PAS composition in the molten state (hereinafter may be simply called molten cyclic PAS) in the form of droplets through openings, flow paths, fine tubular nozzles or drop tubes of a pierced disk such as nozzle orifice plate or spinneret and cools down the droplets with a liquid such as water or with a gas such as the air or nitrogen. Another applicable method extrudes the molten cyclic PAS from die nozzles into cooling water and simultaneously cuts the molten cyclic PAS at the outlets of the die nozzles for pelletization (underwater cutting method). Yet another applicable method discharges the molten cyclic PAS onto a conveyor belt for granulation by rotation of a rotor with nozzles. Another applicable method extrudes the molten cyclic PAS from die nozzles, subsequently extracts the extruded resin into cooling water flowing down along a sloped surface and cuts the resin in a downstream area for pelletization. Especially preferable is the method of dropping the molten cyclic PAS in the form of droplets and subsequently cooling down the droplets to obtain a pellet. The cyclic PAS does not have sufficient viscosity and is brittle even when being plasticized so that there is a difficulty in extruding the molten cyclic PAS into a cooling bath containing a cooling liquid such as water and molding the cyclic PAS into strands. It is accordingly difficult to pelletize the cyclic PAS by the generally known resin pelletization method or more specifically the method of extruding a molten resin from nozzles into a cooling bath to form strands and cutting the strands with a strand cutter.

The atmosphere during pelletization in production of the cyclic PAS pellet may be any of the reduced pressure condition, the air atmosphere and a non-oxidizing atmosphere. The air atmosphere or nitrogen atmosphere is preferable in terms of the economic efficiency and the ease of handling. The nitrogen atmosphere is especially preferable in terms of interference of side reactions such as oxidation.

The following specifically describes a method of dropping the molten cyclic PAS in the form of droplets from a nozzle orifice plate or a spinneret and cooling down the droplets with a liquid such as water or a gas such as the air or nitrogen. This is, however, only illustrative and is not restrictive in any sense. The method drops the molten cyclic PAS through openings, flow paths, fine tubular nozzles or drop tubes of a pierced disk such as a spinneret heated to 180 to 400° C., preferably 190 to 350° C. or more preferably 200 to 300° C. The diameter of the aperture is preferably not less than 0.2 mm, is more preferably not less than 0.25 mm and is furthermore preferably not less than 0.3 mm. The diameter of the aperture is also preferably not greater than 3.0 mm, is more preferably not greater than 2.5 mm and is furthermore preferably not greater than 2.0 mm. The dropped molten cyclic PAS is cooled down in the form of droplets to give a pellet. The cooling method may be, for example, a method using a liquid or a method using a gas. The method using a liquid may be a method of dropping the droplets of the molten cyclic PAS into the liquid. The liquid is preferably water in terms of the ease of handling and the safety, but water is not restrictive. The temperature of the liquid for cooling is preferably not lower than 10° C. and is more preferably not lower than 15° C. The temperature of the liquid for cooling is also preferably not higher than 70° C. and is more preferably not higher than 65° C. The higher temperature than this upper limit temperature may cause cohesion of the cyclic PAS pellet. The method using a gas may be a method of spraying the gas in a countercurrent flow or a concurrent flow relative to the dropping direction while dropping the molten cyclic PAS in the form of droplets, so as to cool down the droplets and obtain a pellet. The type of the gas is not specifically limited. In terms of the economic efficiency and the ease of handling, however, the air or nitrogen is preferable, and nitrogen is more preferable.

The method of melting the cyclic PAS composition is not specifically limited but may be a method of using a vent-type melt extruder or a method of melting and stirring in a melting vessel. The melting temperature changes depending on the formulation of the cyclic PAS composition used as the raw material, the atmosphere and the pressure under heating and the heating time and is thus not unequivocally specifiable. The melting temperature is, for example, not lower than 180° C., is more preferably not lower than 190° C. and is furthermore preferably not lower than 200° C. The melting temperature is also, for example, not higher than 400° C., is more preferably not higher than 350° C. and is furthermore preferably not higher than 300° C. The melting temperature of not lower than 180° C. is equal to or higher than the melting temperature of the cyclic PAS composition and accordingly does not require a long time for melting the cyclic PAS composition. The melting temperature of not higher than 400° C., on the other hand, suppresses the progress of conversion of the cyclic PAS composition to a polymer of the higher degree of polymerization or the progress of side reactions, thus preventing the flowability of the cyclic PAS composition from being extremely lowered.

The method of producing the cyclic PAS pellet using the cyclic PAS composition (b) obtained in the process (I) is not specifically limited but may be any method that can produce a pellet of the type described herein. The method may be, for example, a method of pelletization by the above procedure while maintaining the conditions of the process (I) or a method of taking out the cyclic PAS composition (b) obtained in the process (I) without pelletization, cooling down the cyclic PAS composition (b) and subsequently re-melting and pelletizing the cyclic PAS composition (b) by the above procedure. When the cyclic PAS composition (b) obtained in the process (I) is used to produce the cyclic PAS pellet, the ratio of the cyclic PAS in the cyclic PAS composition (p), which the pellet is made of, to the cyclic PAS in the cyclic PAS composition (a) (reduction ratio of cyclic PAS) is preferably less than 50%, is more preferably less than 40% and is furthermore preferably less than 30%. The above reduction ratio of cyclic PAS is generally not lower than 0%. The above reduction ratio of cyclic PAS may be determined, for example, by high-performance liquid chromatography analysis.

The atmosphere during melting of the cyclic PAS composition in production of the cyclic PAS pellet is preferably a non-oxidizing atmosphere, for example, an inert gas atmosphere such as nitrogen, helium or argon. The reduced pressure condition is also preferable. Especially preferable is either the nitrogen atmosphere or the reduced pressure condition, in terms of the economic efficiency and the ease of handling.

The melting time changes depending on the composition of the cyclic PAS composition (a) used as the raw material, the atmosphere and the pressure under heating and the heating temperature and is thus not unequivocally specifiable. The melting time is, for example, not shorter than 0.05 hours, is preferably not shorter than 0.1 hours, is more preferably not shorter than 0.25 hours and is furthermore preferably not shorter than 0.5 hours. The melting time is also, for example, not longer than 100 hours, is preferably not longer than 20 hours, is more preferably not longer than 10 hours and is furthermore preferably not longer than 6 hours. The melting time in this preferable range enables the cyclic PAS composition (a) as the raw material to be dissolved homogeneously and is also unlikely to cause transformation of the cyclic PAS during melting.

The system of producing the above cyclic PAS pellet may be a batch system or a continuous system. The continuous system is, however preferable in terms of the higher productivity. The conditions for the continuous system are not specifically limited as long as being in the ranges described above. For example, an applicable method supplies the cyclic PAS composition (a) at a constant rate from a hopper to a temperature-controllable melting vessel, feeds the molten cyclic PAS composition (b) from the melting vessel with a gear pump and drops the molten cyclic PAS composition in the form of droplets into cooling water.

The method of supplying the cyclic PAS composition (a) as the raw material into the above melting vessel is not specifically limited. To stably obtain the cyclic PAS pellet by the continuous system, it is preferable to supply the cyclic PAS composition (a) as the raw material at a constant rate. The method of supplying the cyclic PAS composition (a) at a constant rate may be, for example, a continuous supply method from a hopper or a supply method using a screw feeder. When the cyclic PAS composition (a) used as the raw material is powdery, the supply method from the hopper or the like is especially preferable.

The supply rate of the cyclic PAS composition (a) as the raw material into the melting vessel changes depending on the capacity of the melting vessel, the extraction rate of the cyclic PAS composition (b) in the molten state from the melting vessel and the pore size of the spinneret used to drop the cyclic PAS composition (b) from the melting vessel and is thus not unequivocally specifiable. It is, however, preferable to supply the cyclic PAS composition into the melting vessel at a rate that enables the cyclic PAS composition (b) to be continuously dropped from the spinneret. It is especially preferable that the supply rate of the cyclic PAS composition (a) as the raw material into the melting vessel is equivalent to the extraction rate of the cyclic PAS composition (b) from the melting vessel. Additionally, it is preferable to adjust the supply rate of the cyclic PAS composition (a) as the raw material such that the melt retention time from the supply of the cyclic PAS composition into the melting vessel to the extraction from the melting vessel is within a preferable range of melt retention time of the cyclic PAS composition (a). The melt retention time of the cyclic PAS composition (a) is, for example, not shorter than 0.05 hours, is preferably not shorter than 0.1 hours, is more preferably not shorter than 0.25 hours and is furthermore preferably not shorter than 0.5 hours. The upper limit of the melt retention time of the cyclic PAS composition (a) is also, for example, not longer than 100 hours, is preferably not longer than 20 hours, is more preferably not longer than 10 hours and is furthermore preferably not longer than 6 hours. The melt retention time in this preferable range enables the cyclic PAS composition (a) as the raw material to be dissolved homogeneously and is also unlikely to cause transformation of the cyclic PAS during melting.

The atmosphere in the vessel may be either the air atmosphere or a non-oxidizing atmosphere. A plurality of vessels may be coupled with one another. Here the non-oxidizing atmosphere is an atmosphere having the oxygen concentration of not higher than 5% by volume, is preferably an atmosphere having the oxygen concentration of not higher than 2% by volume or is furthermore preferably a substantially oxygen-free atmosphere in the gas phase which the cyclic PAS component is exposed to. More specifically the non-oxidizing atmosphere is an inert gas atmosphere of, for example, nitrogen, helium or argon. Among them, a nitrogen atmosphere is especially preferable in terms of the economic efficiency and the ease of handling.

The method of feeding the molten cyclic PAS composition (b) to the spinneret is not specifically limited as long as the method can feed the cyclic PAS composition at a constant rate. A preferable feeding method uses a pump such as a gear pump or a centrifugal pump. The gear pump generally uses gear engagement for feeding and is characterized by a less variation in discharge rate accompanied with a pressure change to have little effect of a change in viscosity and easy adjustment of the feed rate to a constant value by rotation number of the gear. The centrifugal pump drives an impeller generally with a constant-speed motor, increases the pressure of a fluid by centrifugal force of rotation to feed the fluid, and adjusts the discharge pressure using, for example a valve to control the discharge rate to any desired value. The centrifugal pump is thus characteristically used often to feed, for example, a low-viscosity liquid. To stably drop the molten cyclic PAS composition (b), it is important to keep the feed rate of the molten cyclic PAS composition (b) constant along with the supply rate of the cyclic PAS composition (a) as the raw material into the melting vessel. For this purpose, it is desirable to easily adjust the feed rate. From this standpoint, the feeding method using the gear pump is preferable.

When the temperature of a flow path piping through which the molten cyclic PAS composition (b) is fed from the vessel is equal to or lower than the solidification temperature of the cyclic PAS composition (b), the molten cyclic PAS composition (b) may be cooled and solidified in the flow path to clog the piping. To avoid this problem, it is preferable to heat the flow path piping to or above the melting temperature of the cyclic PAS composition (b). The temperature of the flow path piping should be desirably the temperature that melts the cyclic PAS composition (b) and is preferably not lower than 200° C., is more preferably not lower than 230° C. and is furthermore preferably not lower than 250° C. The upper limit temperature of the flow path piping should be desirably the temperature that interferes with the progress of polymerization of the cyclic PAS composition (b) and side reactions and is preferably not higher than 350° C., is more preferably not higher than 330° C. and is furthermore preferably not higher than 300° C. The same temperature range as that for the flow path piping should be desirably employed for a feeder unit of the feed pump.

The production method of the cyclic PAS pellet described above may be employed for pelletization from the cyclic PAS composition (a) in the above continuous system. An applicable method may drop the molten cyclic PAS composition (b) in the form of droplets from the spinneret into cooling water.

The temperature of the spinneret should be desirably set equal to or higher than the melting temperature of the cyclic PAS composition (b) and is preferably not lower than 180° C., is more preferably not lower than 190° C. and is furthermore preferably not lower than 200° C. The upper limit temperature of the spinneret should be desirably the temperature that interferes with polymerization or decomposition of the cyclic PAS composition (b) and side reactions and is preferably not higher than 400° C., is more preferably not higher than 350° C. and is furthermore preferably not higher than 300° C. Employing such spinneret temperature is likely to avoid the openings of the spinneret from being clogged with the cyclic PAS composition (b).

To ensure the stable pellet geometry, the pore size of the spinneret is preferably not less than 0.2 mm, is more preferably not less than 0.25 mm and is furthermore preferably not less than 0.3 mm. The pore size of the spinneret is also preferably not greater than 5.0 mm, is more preferably not greater than 4.0 mm and is furthermore preferably not greater than 3.0 mm. Employing such spinneret pore size is unlikely to discharge the molten cyclic PAS composition (b) in the stick-like form and ensures stable discharge of droplets.

In pelletization of the cyclic PAS composition (b), the temperature of the cooling liquid for cooling down, solidifying and pelletizing the cyclic PAS composition (b) dropped in the molten state is preferably controlled to a constant temperature, in order to obtain a uniform pellet. More specifically, the temperature of the cooling liquid is preferably not lower than 10° C. and is more preferably not lower than 15° C. The temperature of the cooling liquid is also preferably not higher than 70° C. and is more preferably not higher than 65° C. The temperature of not higher than this upper limit temperature is likely to suppress cohesion of the cyclic PAS pellet. The cooling liquid is not specifically limited as long as the liquid can cool down and recover the cyclic PAS pellet. In terms of the ease of handling and the economic efficiency, water is especially preferable.

In production of the cyclic PAS pellet in the continuous system, the method of successively recovering the produced cyclic PAS pellet is not specifically limited, but the following method may be employed for this purpose. Specifically, the method makes a flow of the cooling liquid used for pelletization as described above, preferably water, by simultaneously supplying and discharging the cooling liquid to a cooling bath at a constant speed, conveys the cyclic PAS pellet on the flow and separates the pellet from the cooling liquid using, for example, a filter placed on the discharge side of the cooling liquid to recover the cyclic PAS pellet. The adequate supply rate of the cooling liquid changes depending on the production rate of the cyclic PAS pellet and is not unequivocally specifiable. The supply rate should, however, be desirably not lower than a flow rate that keeps the temperature of the cooling liquid constant in the bath and is preferably not lower than 1 L/minute and is more preferably not lower than 5 L/minute. The upper limit of the supply rate of the cooling liquid is not specifically limited but is preferably not higher than 300 L/minute and is more preferably not higher than 150 L/minute by taking into account the size of the equipment. The filter used to continuously separate the cooling liquid is, for example, a belt filter.

The following describes a specific procedure of continuously producing the cyclic PAS pellet using the cyclic PAS composition (a) as the raw material. The procedure feeds 4 kg of the cyclic PAS composition (a) by a screw feeder at a rate of 33 g/minute into a stainless steel melting vessel of 10 L capacity with an agitator, heats the melting vessel to 250° C. at a rate of 4° C./minute under a nitrogen atmosphere and stirs the cyclic PAS composition (a) for 1 hour after the temperature reaching 250° C. to dissolve the cyclic PAS composition (a). After dissolution of the cyclic PAS composition (a), the procedure restarts the feed of the cyclic PAS composition (a) at the rate of 33 g/minute by the screw feeder. The procedure subsequently feeds the molten PAS composition (b) in the melting vessel through a flow path piping of 6.35 mm in diameter, which is kept at 250° C. by a mantle heater, at a rate of 33 g/minute by rotation of a gear of an external gear pump at 6 rpm. The procedure then drops and cools down the molten cyclic PAS composition (b) in the form of droplets from a spinneret with openings of 2.0 mm in diameter heated to 250° C. into a 50 L water bath where cooling water of 30° C. is circulated at a flow rate of 10 L/minute. This procedure continuously produces the cyclic PAS pellet.

The cyclic PAS pellet thus obtained has the excellent form of easily conveying the cyclic PAS, the less gas generation amount and the excellent engagement during handling and molding operation and is thus extremely useful for the molding process.

Accordingly, the cyclic PAS pellet is favorably used to be mixed with a variety of resins and produce resin compositions. The method employed to mix the respective components is, for example, a method of feeding the respective components quantitatively by a screw feeder to an extruder hopper and mixing the components or a method of using a tumbler mixer or a Henschel mixer. The method using the screw feeder is especially preferable, since this method ensures discharge of a resin composition with keeping the quantitative performance, makes the feed rate of each component linearly proportional to the rotation speed, has relatively high accuracy and allows for easy adjustment of the feed rate of each component. This method is often employed to discharge or transfer particulates from a hopper. Pelletization of cyclic PAS enhances the ease of conveyance and keeps the quantitative performance.

The resin composition obtained by mixing this cyclic PAS pellet is more likely to have the excellent flowability during melt processing and is also likely to have excellent melt stability. Improvement of such properties, especially the flowability, leads to the excellent melt processability even at low heating temperatures during melt processing of the resin composition and thus advantageously improves the melt processability in manufacture of injection molded products and extrusion molded products such as fibers and films. The reason for such improvement of the properties by mixing the cyclic PAS is not clear but may be attributed to the structural specificity of the cyclic PAS, i.e., the compact geometry due to the ring structure compared with the general linear compound. This structural specificity makes the cyclic PAS likely to have little tangles with a variety of resins used as the matrix, act as a plasticizer to the variety of resins and suppress tangles of the matrix resin.

The mixing amount of the cyclic PAS which is mixed with a variety of resins is not specifically limited. Significant improvement of the properties is, however, achievable by mixing not less than 0.1 parts by weight or preferably not less than 0.5 parts by weight of the cyclic PAS pellet relative to 100 parts by weight of the variety of resins. Significant improvement of the properties is also achievable by mixing not greater than 50 parts by weight, preferably not greater than 20 parts by weight or more preferably not greater than 10 parts by weight of the cyclic PAS pellet relative to 100 parts by weight of the variety of resins.

A fibrous and/or a non-fibrous filler may further be mixed in the above resin composition as appropriate. The mixing amount is, for example, not less than 0.5 parts by weight or preferably not less than 1 part by weight relative to 100 parts by weight of the above variety of resins. The mixing amount is also, for example, not greater than 400 parts by weight, preferably not greater than 300 parts by weight, more preferably not greater than 200 parts by weight and is furthermore preferably not greater than 100 parts by weight. The mixing amount in this range is likely to improve the mechanical strength while maintaining the excellent flowability. The type of the filler used may be any of fibrous, plate-like, powdery and granular fillers. Preferable specific examples of the filler include glass fibers, talc, wollastonite, montmorillonite and layered silicates such as synthetic mica. Especially preferable are glass fibers. The available type of the glass fiber is not specifically limited but may be any glass fiber generally used for reinforcement of resin. The glass fiber used may be selected, for example, among long fiber-type and short-fiber type chopped strands and milled fibers. Two or more of the above fillers may be used in combination. The above filler may be used after surface treatment with a known coupling agent (for example, silane coupling agent, titanate coupling agent) or another surface treatment agent. The glass fibers may be coated with or sized with a thermoplastic resin such as ethylene-vinyl acetate copolymer or a thermosetting resin such as epoxy resin.

To maintain thermal stability of the resin composition, one or more heat resistant material selected among phenolic compounds and phosphorous compounds may be contained in the resin composition. In terms of the effect of improving the heat resistance, the mixing amount of the heat resistant material is equal to or more than 0.01 parts by weight and is preferably equal to or more than 0.02 parts by weight relative to 100 parts by weight of the above variety of resins. In terms of the gas component generated during molding, the above mixing amount is equal to or less than 5 parts by weight and is preferably equal to or less than 1 part by weight relative to 100 parts by weight of the above variety of resins. Combined use of the phenolic compound with the phosphorus compound is especially preferable, since it has significant effects of maintaining heat resistance, thermal stability and flowability.

The following compound may further be mixed in the above resin composition: coupling agents such as organotitanate compounds and organoborane compounds; plasticizers such as poly(alkylene oxide) oligomer compounds, thioether compounds, ester compounds and organophosphorus compounds; crystal nucleating agents such as talc, kaolin, organophosphorus compounds and poly(ether ether ketone)s; metal soaps such as montanic acid waxes, lithium stearate and aluminum stearate; mold release agents such as polycondensation products of ethylene diamine/stearic acid/sebacic acid and silicone compounds; color protection agents such as hypophosphites; and other general additives including lubricants, ultraviolet protection agents, coloring agents, flame retardants and foaming agents. Addition of any of the above compounds by the amount of less than 20 parts by weight, preferably the amount of not more than 10 parts by weight or more preferably the amount of not more than 1 part by weight relative to 100 parts by weight of the above variety of resins is likely to have the beneficial effects.

The production method of the resin composition by mixing the cyclic PAS pellet described above is not specifically limited. For example, an applicable method may premix the cyclic PAS pellet with the variety of resins and optionally the filler and the variety of additives and melt-knead the mixture at the temperature of not lower than the flow temperatures of the variety of resins and the cyclic PAS pellet using a generally known melt mixing machine, such as a single-screw extruder, a twin-screw extruder, a Banbury mixer, a kneader, or a mixing roll. Another applicable method may premix the materials of the resin composition in a solution and remove a solvent. The cyclic PAS pellet may be characterized by the low melting heat and the low crystallinity and is thus enabled to be flowed at the significantly lower temperature than the linear PAS. This is especially favorable characteristic during the melt kneading described above.

The variety of resins mixed with the cyclic PAS pellet are not specifically limited but may be crystalline and amorphous thermoplastic resins and thermosetting resins.

Specific examples of the crystalline resin include polyolefin resins such as polyethylene resins, polypropylene resins and syndiotactic polystyrene, polyvinyl alcohol resins, polyvinylidene chloride resins, polyester resins, polyamide resins, polyacetal resins, polyphenylene sulfide resins, poly(ether ether ketone) resins, polyether ketone resins, polyketone resins, polyimide resins and their copolymers. One of these resins may be used alone, or two or more resins may be used in combination. Among them, in terms of the heat resistance, the moldability, the flowability and the mechanical properties, polyphenylene sulfide resins, polyamide resins and polyester resins are preferable. In terms of the transparency of the resulting molded product, polyester resins are preferable. Using the crystalline resin as the variety of resins is likely to improve the crystallization characteristics, in addition to improvement of the flowability described above. It is especially preferable to use the polyphenylene sulfide resin as the variety of resins. This is likely to achieve improvement of the crystallinity along with improvement of the flowability and is also likely to significantly suppress the appearance of burrs during injection molding as the result of such improvements.

The amorphous resin is not specifically limited but may be any amorphous resin that is melt-moldable. In terms of the heat resistance, however, the amorphous resin used has the glass transition temperature of preferably not lower than 50° C., more preferably not lower than 60° C., furthermore preferably not lower than 70° C. or especially preferably not lower than 80° C. The upper limit of the above glass transition temperature is not specifically limited, but in terms of, for example, the moldability, the upper limit is preferably not higher than 300° C. and is more preferably not higher than 280° C. The glass transition temperature of the amorphous resin denotes a glass transition temperature (Tg) observed by differential calorimetry that heats the amorphous resin at a temperature rise condition of 20° C./minute from 30° C. to an expected glass transition temperature or higher, keeps the amorphous resin at the raised temperature for 1 minute, subsequently cools down the amorphous resin to 0° C. at a temperature decrease condition of 20° C./minute, keeps the amorphous resin at the decreased temperature for 1 minute and then makes a measurement at a temperature re-rise condition of 20° C./minute. A specific example of such amorphous resin may be at least one selected from the group consisting of amorphous nylon resins, polycarbonate (PC) resins, polyarylate resins, ABS resins, poly(meth)acrylate resins, poly(meth)acrylate copolymers, polysulfone resins and polyether sulfone resins. One of such resins may be used alone, or two or more of the resins may be used in combination. Among these amorphous resins, preferably used are polycarbonate (PC) resins having especially high transparency, transparent ABS resins included in ABS resins, polyarylate resins, poly(meth)acrylate resins, poly(meth)acrylate copolymers and polyether sulfone resins. Using the amorphous resin having excellent transparency as the variety of resins has the advantageous characteristic of maintaining the high transparency, in addition to improvement of the flowability during melt processing described above. When the high transparency is desired for the amorphous resin composition, using the cyclic PAS pellet having the melting heat of not greater than 10 J/g is preferable, and the cyclic PAS pellet having substantially no melting peak is more preferable. Using such cyclic PAS pellet facilitates the cyclic PAS to be melted and dispersed during melt kneading with the amorphous resin and is thus effectively likely to reduce aggregates in the resin and improve the transparency.

The resin composition obtained by mixing the cyclic PAS pellet with the variety of resins as described above may be molded by any of generally known techniques, for example, injection molding, extrusion molding, blow molding, press molding or spinning and processed to and used as a variety of molded products. Available examples of the molded products include injection molded products, extrusion molded products, blow molded products, films, sheets and fibers. The variety of products thus obtained may be used in a variety of applications including automobile components, electric and electronic components, architectural components, various vessels and containers, daily necessities, household goods and sanitary articles. The above resin composition and its molded products are recyclable. For example, a resin composition obtained by pulverizing the above resin composition and its molded products preferably to the powder level and blending additives as appropriate with the powder may be used similarly to the above resin composition and may be processed to a molded product.

The cyclic PAS pellet produced has the excellent molding processability and is additionally enabled to be favorably used as a prepolymer to produce a polymer by ring-opening polymerization. The above cyclic PAS pellet also has extremely high flowability in the molten state. A composite material structure comprised of PAS and fibrous material can thus be readily produced by melt kneading the cyclic PAS pellet with a variety of fibrous materials and fillers as described above with regard to the production method of the PAS (c) and subsequently converting the melt mixture to a cyclic PAS polymer of the higher degree of polymerization. The prepolymer denotes a PAS prepolymer which includes at least the cyclic PAS and is convertible to a PAS polymer of the higher degree of polymerization.

EXAMPLES

Our methods, compositions and pellets are described more specifically with reference to examples. These examples are, however, only illustrative and not restrictive.

Measurement of Molecular Weight

As for the molecular weights of PAS and cyclic PAS, the number-average molecular weight (Mn) and the weight-average molecular weight (Mw) of polystyrene equivalent were determined by gel permeation chromatography (GPC) as one type of size exclusion chromatography (SEC). The molecular weight distribution was calculated as Mw/Mn. The following shows the measurement conditions of GPC:

Apparatus: SSC-7100 manufactured by Senshu Scientific Co., Ltd.
Column: Shodex UT806M manufactured by Showa Denko K.K.
Eluent: 1-chloronaphthalene
Detector: differential refractive index detector
Column temperature: 210° C.
Pre-thermostatic oven temperature: 250° C.
Pump thermostatic oven temperature: 50° C.
Detector temperature: 210° C.
Flow rate: 1.0 mL/min
Sample injection amount: 300 μL, (slurry: about 0.2% by weight)

Measurement of Cyclic PAS Content

The cyclic PAS content in PAS was determined by the following procedure using high-performance liquid chromatography (HPLC).

The procedure dissolved about 10 mg of a product obtained by heating cyclic PAS in about 5 g of 1-chloronaphthalene at 250° C. When the temperature decreased to room temperature, a precipitate was formed. The procedure filtered out a 1-chloronaphthalene-insoluble component using a membrane filter having the pore size of 0.45 μm and thereby obtained a 1-chloronaphthalene-soluble component. The procedure quantitatively determined the amount of unreacted cyclic PAS by HPLC measurement of the obtained soluble component and calculated the cyclic PAS content in the PAS. The following shows the measurement conditions of HPLC:
Apparatus: LC-10Avp Series manufactured by Shimadzu Corporation
Column: Mightysil RP-18 GP150-4.6 (5 µm)
Detector: photodiode array detector (UV=270 nm)
Calculation of Cyclic PAS Reduction Ratio
1. Cyclic PAS Reduction Ratio of Cyclic PAS Composition (b)

=100−(cyclic PAS content in cyclic PAS composition (b))/(cyclic PAS content in cyclic PAS composition(a))*100

* An increase in cyclic PAS content in the cyclic PAS composition (b) is assumed to be a reduction ratio of 0%.
2. Cyclic PAS Reduction Ratio of PAS (c)

=100−(cyclic PAS content in cyclic PAS composition (c))/(cyclic PAS content in cyclic PAS (c))*100

3. Cyclic PAS Reduction Ratio of Cyclic PAS Pellet (Cyclic PAS Composition (p))

=100−(cyclic PAS content in cyclic PAS composition (p))/(cyclic PAS content in cyclic PAS composition(a))*100

* An increase in cyclic PAS content in the cyclic PAS composition (p) is assumed to be a reduction ratio of 0%.
Measurement of Weight Reduction Ratio During Heating The weight reduction ratio during heating was measured using a thermogravimetric analyzer under the following conditions. The sample was fine particles of 2 mm or less in diameter.
Apparatus: TAG7 manufactured by PerkinElmer, Inc.
Measurement atmosphere: under nitrogen stream
Amount of sample added: about 10 mg
Measurement conditions:
(a) keeping at a programmed temperature of 50° C. for 1 minute; and
(b) raising temperature from the programmed temperature of 50° C. to 350° C. at a temperature rise rate of 20° C./minute.
Measurement of Powder or Pellet Residue on Sieve after Vibrating The procedure vibrated 100 g of powder or pellet on a 20-mesh sieve (aperture of 0.833 mm, diameter of 200 mm) for 2 minutes using a vibrating sieve (ANALYSETTE manufactured by FRITSCH GmbH) and measured the powder or pellet residue on the sieve.
Measurement of Maximum Diameter of Pellet The maximum diameter of the pellet was determined by selecting 20 pieces of the pellet at random, measuring the maximum lengths of the selected pellet pieces using a vernier caliper and calculating an average of the measurement values.

Reference Example 1

In an autoclave equipped with an agitator and an upper extracting valve, 1.648 kg of a 48 wt % sodium hydrosulfide aqueous solution (0.791 kg (14.1 mol) of sodium hydrosulfide), 1.225 kg of a 48 wt % sodium hydroxide aqueous solution (0.588 kg (14.7 mol) of sodium hydroxide), 35 L of N-methyl-2-pyrrolidone (NMP) and 2.278 kg (15.5 mol) of p-dichlorobenzene (p-DCB) were mixed.

After sealing the reaction vessel in nitrogen gas at room temperature and under ordinary pressure, the procedure raised the temperature from room temperature to 200° C. in 25 minutes, while stirring the mixture at 400 rpm. The procedure further raised the temperature to 250° C. in 35 minutes and continued the reaction at 250° C. for 2 hours. The procedure then gradually opened the extracting valve while keeping the internal temperature at 250° C. to distil away 26.6 kg of the solvent in 40 minutes. After completion of distillation-away of the solvent, the procedure cooled down the autoclave to around room temperature and recovered the content.

The procedure then heated and stirred the recovered content under nitrogen to raise the temperature of the reaction solution to 100° C. After keeping the content at 100° C. for 20 minutes, the procedure made the content subject to solid-liquid separation using a stainless steel mesh having the average aperture of 10 µm, dropped the resulting filtrate into about 3-fold volume of methanol and recovered the deposit component. The procedure re-slurried the obtained solid component with about 2.5 L of 80° C. warm water, stirred the slurry at 80° C. for 30 minutes and subsequently filtered the slurry. This series of operations was repeated three times. The procedure then dried the resulting solid content under reduced pressure at 80° C. for 8 hours to obtain dry solid powder. Hereinafter the obtained dry solid is called cyclic polyphenylene sulfide composition (a) of Reference Example 1 or cyclic PAS composition (a) of Reference Example 1. The results of analysis by infrared absorption spectroscopy and high-performance liquid chromatography showed that the cyclic PAS composition (a) of Reference Example 1 contained 72% by weight of cyclic polyphenylene sulfide. The weight reduction ratio ΔWr(a) under heating at 200° C. to 330° C. was 1.398%.

Reference Example 2

Reference Example 2 obtained dry solid powder by the same procedure as that of Reference Example 1 except that the amount of p-DCB added as the raw material was 2.116 kg (14.4 mol) and the solid-liquid separation temperature was 50° C. The results of analysis by infrared absorption spectroscopy and high-performance liquid chromatography showed that the obtained dry solid contained 85% by weight of cyclic polyphenylene sulfide. The weight reduction ratio ΔWr(a) under heating at 200° C. to 330° C. was 1.439%.

Example 1

The procedure weighed 10 g of the cyclic polyphenylene sulfide composition (a) of Reference Example 1 in a glass vial, reduced the internal pressure of the vial to or below 0.01 kPa using a vacuum pump and subsequently substituted the atmosphere in the vial with nitrogen. This series of operations was repeated three times. In the process (I), the procedure placed the vial, which was kept under the reduced pressure condition of or below 0.01 kPa by continuous suction with the vacuum pump, in an electric oven having the temperature controlled to 250° C. and heated the vial for 2 hours. The procedure introduced nitrogen into the vial under heating to return the internal pressure of the vial to ordinary pressure, subsequently sampled a portion of a product from the vial for analysis using a metal needle and reduced the pressure again to 0.01 kPa. In the subsequent process (II), the procedure raised the temperature of the electric oven to 340° C., heated the vial for another 4 hours, took out the vial kept under the reduced pressure condition from the electric oven and left the vial to be cooled down. After cooling down the vial to room temperature, the procedure introduced nitrogen into the vial to return the internal pressure of the vial to ordinary pressure and recovered a product. The product of the process (I) (cyclic PAS composition (b) of Example 1) was a transparent, brown, brittle solid and was fully soluble in 1-chloronaphthalene at 250° C. The result of HPLC measurement showed that the reduction ratio of cyclic polyphenylene sulfide was 0%. The weight reduction ratio ΔWr(b) under heating at 200° C. to 330° C. was 0.173%. The product of the process (II) (PAS (c) of Example 1) was an opaque, brown solid and was fully soluble in 1-chloronaphthalene at 250° C. The result of HPLC measurement showed that the reduction ratio of cyclic polyphenylene sulfide was 89%. The result of GPC measurement identified a peak derived from cyclic polyphenylene sulfide and a peak of a produced polymer (polyphenylene sulfide). The weight-average molecular weight of the obtained polyphenylene sulfide was 28,100; the polydispersity was 2.1; and the weight reduction ratio under heating at 100° C. to 330° C. was 0.021%. The results are shown in Tables 1 and 2.

Example 2

Example 2 performed the same procedure as that of Example 1, except that the heating temperature in the process (I) was 280° C. A product of the process (I) (cyclic PAS composition (b) of Example 2) was a transparent, brown, brittle solid and was fully soluble in 1-chloronaphthalene at 250° C. The result of HPLC measurement showed that the reduction ratio of cyclic polyphenylene sulfide was 0%. The weight reduction ratio ΔWr(b) under heating at 200° C. to 330° C. was 0.144%. A product of the process (II) (PAS (c) of Example 2) was an opaque, brown solid and was fully soluble in 1-chloronaphthalene at 250° C. The result of HPLC measurement showed that the reduction ratio of cyclic polyphenylene sulfide was 91%. The result of GPC measurement identified a peak derived from cyclic polyphenylene sulfide and a peak of a produced polymer (polyphenylene sulfide). The weight-average molecular weight of the obtained polyphenylene sulfide was 28,500; the polydispersity was 2.1; and the weight reduction ratio under heating at 100° C. to 330° C. was 0.017%. The results are shown in Tables 1 and 2.

Example 3

Example 3 performed the same procedure as that of Example 1, except that the heating temperature in the process (I) was 300° C. A product of the process (I) (cyclic PAS composition (b) of Example 3) was a transparent, brown, brittle solid and was fully soluble in 1-chloronaphthalene at 250° C. The result of HPLC measurement showed that the reduction ratio of cyclic polyphenylene sulfide was 8%. The weight reduction ratio ΔWr(b) under heating at 200° C. to 330° C. was 0.023%. A product of the process (II) (PAS (c) of Example 3) was an opaque, brown solid and was fully soluble in 1-chloronaphthalene at 250° C. The result of HPLC measurement showed that the reduction ratio of cyclic polyphenylene sulfide was 90%. The result of GPC measurement identified a peak derived from cyclic polyphenylene sulfide and a peak of a produced polymer (polyphenylene sulfide). The weight-average molecular weight of the obtained polyphenylene sulfide was 29,000; the polydispersity was 2.1; and the weight reduction ratio under heating at 100° C. to 330° C. was 0.014%. The results are shown in Tables 1 and 2.

Example 4

Example 4 performed the same procedure as that of Example 1, except that the heating time in the process (I) was 0.5 hours. A product of the process (I) (cyclic PAS composition (b) of Example 4) was a transparent, brown, brittle solid and was fully soluble in 1-chloronaphthalene at 250° C. The result of HPLC measurement showed that the reduction ratio of cyclic polyphenylene sulfide was 0%. The weight reduction ratio ΔWr(b) under heating at 200° C. to 330° C. was 0.778%. A product of the process (II) (PAS (c) of Example 4) was an opaque, brown solid and was fully soluble in 1-chloronaphthalene at 250° C. The result of HPLC measurement showed that the reduction ratio of cyclic polyphenylene sulfide was 89%. The result of GPC measurement identified a peak derived from cyclic polyphenylene sulfide and a peak of a produced polymer (polyphenylene sulfide). The weight-average molecular weight of the obtained polyphenylene sulfide was 26,600; the polydispersity was 2.1; and the weight reduction ratio under heating at 100° C. to 330° C. was 0.017%. The results are shown in Tables 1 and 2.

Example 5

Example 5 performed the same procedure as that of Example 2, except that the heating time in the process (I) was 0.5 hours. A product of the process (I) (cyclic PAS composition (b) of Example 5) was a transparent, brown, brittle solid and was fully soluble in 1-chloronaphthalene at 250° C. The result of HPLC measurement showed that the reduction ratio of cyclic polyphenylene sulfide was 0%. The weight reduction ratio ΔWr(b) under heating at 200° C. to 330° C. was 0.701%. A product of the process (II) (PAS (c) of Example 5) was an opaque, brown solid and was fully soluble in 1-chloronaphthalene at 250° C. The result of HPLC measurement showed that the reduction ratio of cyclic polyphenylene sulfide was 90%. The result of GPC measurement identified a peak derived from cyclic polyphenylene sulfide and a peak of a produced polymer (polyphenylene sulfide). The weight-average molecular weight of the obtained polyphenylene sulfide was 27,200; the polydispersity was 2.1; and the weight reduction ratio under heating at 100° C. to 330° C. was 0.015%. The results are shown in Tables 1 and 2.

Example 6

Example 6 performed the same procedure as that of Example 3, except that the heating time in the process (I) was 0.5 hours. A product of the process (I) (cyclic PAS composition (b) of Example 6) was a transparent, brown, brittle solid and was fully soluble in 1-chloronaphthalene at 250° C. The result of HPLC measurement showed that the reduction ratio of cyclic polyphenylene sulfide was 2%. The weight reduction ratio ΔWr(b) under heating at 200° C. to 330° C. was 0.073%. A product of the process (II) (PAS (c) of Example 6) was an opaque, brown solid and was fully soluble in 1-chloronaphthalene at 250° C. The result of HPLC measurement showed that the reduction ratio of cyclic polyphenylene sulfide was 89%. The result of GPC measurement identified a peak derived from cyclic polyphenylene sulfide and a peak of a produced polymer (polyphenylene sulfide). The weight-average molecular weight of the obtained polyphenylene sulfide was 28,200; the polydispersity was 2.1; and the weight reduction ratio under heating at 100° C. to 330° C. was 0.016%. The results are shown in Tables 1 and 2.

Example 7

Example 7 performed the same procedure as that of Example 6, except that the heating time in the process (I) was 1 hour. A product of the process (I) (cyclic PAS composition (b) of Example 7) was a transparent, brown, brittle solid and was fully soluble in 1-chloronaphthalene at 250° C. The result of HPLC measurement showed that the reduction ratio of cyclic polyphenylene sulfide was 6%. The weight reduction ratio ΔWr(b) under heating at 200° C. to 330° C. was 0.050%. A product of the process (II) (PAS (c) of Example 7) was an opaque, brown solid and was fully soluble in 1-chloronaphthalene at 250° C. The result of HPLC measurement showed that the reduction ratio of cyclic polyphenylene sulfide was 92%. The result of GPC measurement identified a peak derived from cyclic polyphenylene sulfide and a peak of a produced polymer (polyphenylene sulfide). The weight-average molecular weight of the obtained polyphenylene sulfide was 28,700; the polydispersity was 2.2; and the weight reduction ratio under heating at 100° C. to 330° C. was 0.012%. The results are shown in Tables 1 and 2.

Example 8

Example 8 performed the same procedure as that of Example 7, except that the heating temperature in the process (I) was 280° C. A product of the process (I) (cyclic PAS composition (b) of Example 8) was a transparent, brown, brittle solid and was fully soluble in 1-chloronaphthalene at 250° C. The result of HPLC measurement showed that the reduction ratio of cyclic polyphenylene sulfide was 0%. The weight reduction ratio ΔWr(b) under heating at 200° C. to 330° C. was 0.125%. A product of the process (II) (PAS (c) of Example 8) was an opaque, brown solid and was fully soluble in 1-chloronaphthalene at 250° C. The result of HPLC measurement showed that the reduction ratio of cyclic polyphenylene sulfide was 92%. The result of GPC measurement identified a peak derived from cyclic polyphenylene sulfide and a peak of a produced polymer (polyphenylene sulfide). The weight-average molecular weight of the obtained polyphenylene sulfide was 28,500; the polydispersity was 2.1; and the weight reduction ratio under heating at 100° C. to 330° C. was 0.014%. The results are shown in Tables 1 and 2.

Example 9

Example 9 performed the same procedure as that of Example 8, except that the pressure in the process (I) was adjusted to 1.3 kPa using nitrogen and a pressure controller. A product of the process (I) (cyclic PAS composition (b) of Example 9) was a transparent, brown, brittle solid and was fully soluble in 1-chloronaphthalene at 250° C. The result of HPLC measurement showed that the reduction ratio of cyclic polyphenylene sulfide was 0%. The weight reduction ratio ΔWr(b) under heating at 200° C. to 330° C. was 0.673%. A product of the process (II) (PAS (c) of Example 9) was an opaque, brown solid and was fully soluble in 1-chloronaphthalene at 250° C. The result of HPLC measurement showed that the reduction ratio of cyclic polyphenylene sulfide was 89%. The result of GPC measurement identified a peak derived from cyclic polyphenylene sulfide and a peak of a produced polymer (polyphenylene sulfide). The weight-average molecular weight of the obtained polyphenylene sulfide was 27,100; the polydispersity was 2.1; and the weight reduction ratio under heating at 100° C. to 330° C. was 0.018%. The results are shown in Tables 1 and 2.

Example 10

Example 10 performed the same procedure as that of Example 8, except that the pressure in the process (I) was adjusted to 13 kPa using nitrogen and a pressure controller. A product of the process (I) (cyclic PAS composition (b) of Example 10) was a transparent, brown, brittle solid and was fully soluble in 1-chloronaphthalene at 250° C. The result of HPLC measurement showed that the reduction ratio of cyclic polyphenylene sulfide was 0%. The weight reduction ratio ΔWr(b) under heating at 200° C. to 330° C. was 0.889%. A product of the process (II) (PAS (c) of Example 10) was an opaque, brown solid and was fully soluble in 1-chloronaphthalene at 250° C. The result of HPLC measurement showed that the reduction ratio of cyclic polyphenylene sulfide was 90%. The result of GPC measurement identified a peak derived from cyclic polyphenylene sulfide and a peak of a produced polymer (polyphenylene sulfide). The weight-average molecular weight of the obtained polyphenylene sulfide was 26,900; the polydispersity was 2.0; and the weight reduction ratio under heating at 100° C. to 330° C. was 0.015%. The results are shown in Tables 1 and 2.

Example 11

Example 11 performed the same procedure as that of Example 8, except using the cyclic polyphenylene sulfide composition obtained in Reference Example 2. A product of the process (I) was a transparent, light brown, brittle solid and was fully soluble in 1-chloronaphthalene at 250° C. The result of HPLC measurement showed that the reduction ratio of cyclic polyphenylene sulfide was 0%. The weight reduction ratio ΔWr(b) under heating at 200° C. to 330° C. was 0.158%. A product of the process (II) was an opaque, brown solid and was fully soluble in 1-chloronaphthalene at 250° C. The result of HPLC measurement showed that the reduction ratio of cyclic polyphenylene sulfide was 94%. The result of GPC measurement identified a peak derived from cyclic polyphenylene sulfide and a peak of a produced polymer (polyphenylene sulfide). The weight-average molecular weight of the obtained polyphenylene sulfide was 48,000; the polydispersity was 2.2; and the weight reduction ratio under heating at 100° C. to 330° C. was 0.009%. The results are shown in Tables 1 and 2.

Comparative Example 1

Comparative Example 1 performed the same procedure as that of Example 1 excluding the process (I) and obtained a brown solid. At the start of heating of a vial placed in an electric oven under reduced pressure in the process (II), transparent, scatter was observed on the wall surface of the vial. A product (PAS (c) of Comparative Example 1) was fully soluble in 1-chloronaphthalene at 250° C. The result of HPLC measurement showed that the reduction ratio of cyclic polyphenylene sulfide was 91%. The result of GPC measurement identified a peak derived from cyclic polyphenylene sulfide and a peak of a produced polymer (polyphenylene sulfide). The weight-average molecular weight of the obtained polyphenylene sulfide was 25,800; the polydispersity was 2.1; and the weight reduction ratio under heating at 100° C. to 330° C. was 0.023%. The results are shown in Tables 1 and 2.

Comparative Example 2

The procedure weighed 10 g of the cyclic polyphenylene sulfide composition (a) of Reference Example 1 in a glass vial, reduced the internal pressure of the vial to or below 0.01 kPa using a vacuum pump and subsequently substituted the atmosphere in the vial with nitrogen. This series of operations was repeated three times. The procedure placed the vial, which was kept under the reduced pressure condition of or below 0.01 kPa by continuous suction with the vacuum pump, in an electric oven having the temperature controlled to 30° C. The procedure subsequently heated the electric oven to 340° C. at a rate of 30° C./minute, took out the vial kept under the reduced pressure condition from the electric oven at the temperature reaching 340° C. and left the vial to be cooled down. After cooling down the vial to room temperature, the procedure introduced nitrogen into the vial to return the internal pressure of the vial to ordinary pressure and recovered a product of the process (I) (cyclic PAS composition (b) of Comparative Example 2). The product of the Process (I) was a transparent, brown solid. The result of HPLC measurement showed that the reduction ratio of cyclic polyphenylene sulfide was 5%. The weight reduction ratio $\Delta Wr(b)$ under heating at 200° C. to 330° C. was 1.189%.

The procedure placed the product of the process (I) in a vial, reduced the internal pressure of the vial to or below 0.01 kPa using a vacuum pump and subsequently substituted the atmosphere in the vial with nitrogen. This series of operations was repeated three times. The procedure placed the vial, which was kept under the reduced pressure condition of or below 0.01 kPa by continuous suction with the vacuum pump, in an electric oven having the temperature controlled to 340° C., heated the vial for 4 hours, took out the vial kept under the reduced pressure condition from the electric oven and left the vial to be cooled down. After cooling down the vial to room temperature, the procedure introduced nitrogen into the vial to return the internal pressure of the vial to ordinary pressure and recovered a product of the process (II) (PAS (c) of Comparative Example 2). The product of the process (II) was an opaque, brown solid and was fully soluble in 1-chloronaphthalene at 250° C. The result of HPLC measurement showed that the reduction ratio of cyclic polyphenylene sulfide was 93%. The result of GPC measurement identified a peak derived from cyclic polyphenylene sulfide and a peak of a produced polymer (polyphenylene sulfide). The weight-average molecular weight of the obtained polyphenylene sulfide was 25,900; the polydispersity was 2.1; and the weight reduction ratio under heating at 100° C. to 330° C. was 0.021%. The results are shown in Tables 1 and 2.

Comparative Example 3

Comparative Example 3 performed the same procedure as that of Comparative Example 1 except using the cyclic polyphenylene sulfide composition (a) of Reference Example 2, in place of the cyclic PAS composition (a) of Reference Example 1. A product (PAS (c) of Comparative Example 3) was an opaque, brown solid and was fully soluble in 1-chloronaphthalene at 250° C. The result of HPLC measurement showed that the reduction ratio of cyclic polyphenylene sulfide was 90%. The result of GPC measurement identified a peak derived from cyclic polyphenylene sulfide and a peak of a produced polymer (polyphenylene sulfide). The weight-average molecular weight of the obtained polyphenylene sulfide was 43,000; the polydispersity was 2.1; and the weight reduction ratio under heating at 100° C. to 330° C. was 0.015%. The results are shown in Tables 1 and 2.

Comparative Example 4

Comparative Example 4 performed the same procedure as that of Example 1, except that the heating temperature in the process (I) was 200° C., which is not higher than the melting temperature of the cyclic PAS. A product of the process (I) (cyclic PAS composition (b) of Example Comparative Example 4) was light brown powder and was fully soluble in 1-chloronaphthalene at 250° C. The result of HPLC measurement showed that the reduction ratio of cyclic polyphenylene sulfide was 0%. The weight reduction ratio $\Delta Wr(b)$ under heating at 200° C. to 330° C. was 1.242%. A product of the process (II) (PAS (c) of Comparative Example 4) was an opaque, brown solid with little scatter. The product of the process (II) was fully soluble in 1-chloronaphthalene at 250° C. The result of HPLC measurement showed that the reduction ratio of cyclic polyphenylene sulfide was 91%. The result of GPC measurement identified a peak derived from cyclic polyphenylene sulfide and a peak of a produced polymer (polyphenylene sulfide). The weight-average molecular weight of the obtained polyphenylene sulfide was 25,700; the polydispersity was 2.1; and the weight reduction ratio under heating at 100° C. to 330° C. was 0.023%. The results are shown in Tables 1 and 2.

Comparative Example 5

Comparative Example 5 performed the same procedure as that of Example 7, except that the heating temperature in the process (I) was 350° C. At the sampling time after the process (I), the product was highly viscous and thereby caused difficulty in sampling. The procedure accordingly took out the vial under the reduced pressure condition from the electric oven and cooled down the vial. After cooling down the vial to room temperature, the procedure introduced nitrogen into the vial to return the internal pressure of the vial to ordinary pressure and recovered a product of the process (I) (cyclic PAS composition (b) of Comparative Example 5). The product of the process (I) was an opaque, brown solid and was fully soluble in 1-chloronaphthalene at 250° C. The result of HPLC measurement showed that the reduction ratio of cyclic polyphenylene sulfide was 65%. The result of GPC measurement identified a peak derived from cyclic polyphenylene sulfide and a peak of a produced polymer (polyphenylene sulfide). The weight reduction ratio $\Delta Wr(b)$ under heating at 200° C. to 330° C. was 0.031%. The process (II) was performed by the same procedure as that of Comparative Example 2. A product of the process (II) (PAS (c) of Comparative Example 5) was an opaque, brown solid and was fully soluble in 1-chloronaphthalene at 250° C. The result of HPLC measurement showed that the reduction ratio of cyclic polyphenylene sulfide was 92%. The result of GPC measurement identified a peak derived from cyclic polyphenylene sulfide and a peak of a produced polymer (polyphenylene sulfide). The weight-average molecular weight of the obtained polyphenylene sulfide was 25,900; the polydispersity was 2.1; and the weight reduction ratio under heating at 100° C. to 330° C. was 0.012%. The results are shown in Tables 1 and 2.

A comparison between Comparative Examples 1 to 3 and Examples 1 to 11 shows that performing the process (I) increases the molecular weight of polyphenylene sulfide obtained after polymerization (in the process (II)). The result of Comparative Example 4 shows that the temperature in the process (I) that is not higher than the melting temperature of the cyclic polyphenylene sulfide results in the weight reduction ratio ($\Delta Wr(b)$) of the cyclic PAS composition (b) after the operations of the process (I) of not less than 1.0%, which indicates the no effect of the process (I). Additionally, using the cyclic PAS having the weight reduction ratio ($\Delta Wr(b)$) of not less than 1.0% for polymerization by the operations of the process (II) does not substantially change the molecular weight of the resulting polyphenylene sulfide. This indicates no substantial effect on increasing the molecular weight. The results of Examples 8 to 10 show that the lower pressure of the reduced pressure condition in the process (I) has the greater effect on the decrease in weight reduction ratio (ΔWr(b)) and also results in producing a polyphenylene sulfide of the higher molecular weight after the operations of the process (II). The result of Comparative Example 5 performing the process (I) at 350° C. shows that the reduction ratio of cyclic polyphenylene sulfide is not less than 50%. Polymerization accordingly proceeds to produce polyphenylene sulfide without the sufficient effects of the process (I). This indicates no substantial effect on increasing the molecular weight, like the case without the process (I).

Comparative Example 6

When 100 g of the powder of the cyclic polyphenylene sulfide composition (a) of Reference Example 1 was vibrated on a 20-mesh sieve (aperture of 0.833 mm) for 2 minutes using a vibrating sieve, the residue on the sieve was 3.2% by weight. The weight reduction ratio ΔWr(a) under heating at 200° C. to 330° C. was 1.391%. When the dry powder was tried to be conveyed using a single-screw feeder having a ratio L/D of screw length L to screw diameter D equal to 12, the powder was compacted in the screw and failed to be conveyed. The results are shown in Tables 3 and 4.

Comparative Example 7

When 100 g of the powder of the cyclic polyphenylene sulfide composition (a) of Reference Example 2 was vibrated on the 20-mesh sieve (aperture of 0.833 mm) for 2 minutes using the vibrating sieve, the residue on the sieve was 2.5% by weight. The weight reduction ratio ΔWr(a) under heating at 200° C. to 330° C. was 1.440%. When the dry powder was tried to be conveyed using a screw feeder like Comparative Example 6, the powder was compacted in the screw and failed to be conveyed. The results are shown in Tables 3 and 4.

Example 12

In the process (I), the procedure placed the cyclic polyphenylene sulfide composition (a) of Reference Example 1 in a stainless steel reaction vessel with an agitator, raised the temperature from room temperature to 250° C. in 30 minutes under a nitrogen gas atmosphere to melt the cyclic polyphenylene sulfide composition (a), reduced the pressure after the temperature reaching 250° C., and stirred the cyclic polyphenylene sulfide composition (a) for 2 hours (process (I)). The procedure returned the internal pressure of the reaction vessel to ordinary pressure with nitrogen, ejected the molten material in the form of droplets from a spinneret having the pore diameter of 0.6 mm and the temperature controlled to 250° C. using a gear pump, and dropped the droplets of the molten material into water of 30° C. to cool down the droplets, thus obtaining a cyclic PAS pellet. The procedure then selected 20 pieces of the pellet at random and measured the average maximum length of the selected pellet pieces to be 5.3 mm. When 100 g of the above cyclic PAS pellet was vibrated on a 20-mesh sieve (aperture of 0.833 mm) for 2 minutes using a vibrating sieve, the residue on the sieve was 98.5% by weight. The obtained pellet was fully soluble in 1-chloronaphthalene at 250° C. The result of HPLC measurement showed that the reduction ratio of cyclic polyphenylene sulfide was 0%. As clearly understood from the cyclic PAS content of the cyclic PAS composition (a) of Reference Example 1 and the above reduction ratio of cyclic PPS, the content of cyclic PPS in the cyclic PAS composition (p) which the cyclic PAS pellet was comprised of was not less than 50% by weight. The weight reduction ratio ΔWr(p) of the above cyclic PAS pellet under heating at 200° C. to 330° C. was 0.188%. This shows a reduction of the gas generation amount, compared with the composition before pelletization.

The procedure subsequently placed the obtained pellet in a vial, reduced the internal pressure of the vial to or below 0.01 kPa using a vacuum pump and subsequently substituted the atmosphere in the vial with nitrogen. This series of operations was repeated three times. In the process (II), The procedure placed the vial, which was kept under the reduced pressure condition of or below 0.01 kPa by continuous suction with the vacuum pump, in an electric oven heated to 340° C., heated the vial for 4 hours, took out the vial kept under the reduced pressure condition from the electric oven, returned the internal pressure of the vial to ordinary pressure with nitrogen and cooled down the vial to room temperature. A product of the process (II) (PAS (c) of Example 12) was an opaque, brown solid and was fully soluble in 1-chloronaphthalene at 250° C. The result of HPLC measurement showed that the reduction ratio of cyclic polyphenylene sulfide was 90%. The result of GPC measurement identified a peak derived from cyclic polyphenylene sulfide and a peak of a produced polymer (polyphenylene sulfide). The weight-average molecular weight of the obtained polyphenylene sulfide was 28,700; the polydispersity was 2.1; and the weight reduction ratio under heating at 100° C. to 330° C. was 0.019%. When the pellet was tried to be conveyed using a screw feeder like Comparative Example 6, the pellet was successfully conveyed without being compacted. The results are shown in Tables 3 to 5.

Example 13

Example 13 performed the same procedure as that of Example 12, except that the melting temperature and the spinneret temperature in the process (I) were 300° C. and the stirring time was 1 hour. The average maximum length of a cyclic PAS pellet obtained was measured to be 2.8 mm. When 100 g of the above cyclic PAS pellet was vibrated on a 20-mesh sieve (aperture of 0.833 mm) for 2 minutes using a vibrating sieve, the residue on the sieve was 97.5% by weight. The obtained pellet was fully soluble in 1-chloronaphthalene at 250° C. The result of HPLC measurement showed that the reduction ratio of cyclic polyphenylene sulfide was 6%. As clearly understood from the cyclic PAS content of the cyclic PAS composition (a) of Reference Example 1 and the above reduction ratio of cyclic PPS, the content of cyclic PPS in the cyclic PAS composition (p) which the cyclic PAS pellet was comprised of was not less than 50% by weight. The weight reduction ratio ΔWr(p) of the above cyclic PAS pellet under heating at 200° C. to 330° C. was 0.049%. A product of the process (II) (PAS (c) of Example 13) was an opaque, brown solid and was fully soluble in 1-chloronaphthalene at 250° C. The result of HPLC measurement showed that the reduction ratio of cyclic polyphenylene sulfide was 92%. The result of GPC measurement identified a peak derived from cyclic polyphenylene sulfide and a peak of a produced polymer (polyphenylene sulfide). The weight-average molecular weight of the obtained polyphenylene sulfide was 29,000; the polydispersity was 2.1; and the weight reduction ratio under heating at 100° C. to 330° C. was 0.015%. When the pellet was tried to be conveyed using a screw feeder like Comparative Example 6, the pellet was successfully conveyed without being compacted. The results are shown in Tables 3 to 5.

Example 14

Example 14 performed the same procedure as that of Example 12, except using the cyclic polyphenylene sulfide composition obtained in Reference Example 2 and obtained a cyclic PAS pellet. The average maximum length of the obtained cyclic PAS pellet was measured to be 5.3 mm. When 100 g of the pellet was vibrated on a 20-mesh sieve for 2 minute using a vibrating sieve, the residue on the 20-mesh sieve was 98.5% by weight. The obtained pellet was fully soluble in 1-chloronaphthalene at 250° C. The result of HPLC measurement showed that the reduction ratio of cyclic polyphenylene sulfide was 0%. The weight reduction ratio $\Delta Wr(p)$ under heating at 200° C. to 330° C. was 0.185%. A product of the process (II) was an opaque, brown solid and was fully soluble in 1-chloronaphthalene at 250° C. The result of HPLC measurement showed that the reduction ratio of cyclic polyphenylene sulfide was 92%. The result of GPC measurement identified a peak derived from cyclic polyphenylene sulfide and a peak of a produced polymer (polyphenylene sulfide). The weight-average molecular weight of the obtained polyphenylene sulfide was 47,000; the polydispersity was 2.2; and the weight reduction ratio under heating at 100° C. to 330° C. was 0.008%. When the pellet was tried to be conveyed using a screw feeder like Comparative Example 6, the pellet was successfully conveyed without being compacted. The results are shown in Tables 3 to 5.

Example 15

In the process (I), the procedure placed the cyclic polyphenylene sulfide composition (a) of Reference Example 1 in a stainless steel reaction vessel with an agitator and raised the temperature from room temperature to 280° C. in 30 minutes under a nitrogen gas atmosphere to melt the cyclic polyphenylene sulfide composition (a). In the course of this temperature rise, pressure reduction started at the temperature reaching 250° C. The procedure continued stirring for 1 hour after the temperature reaching 280° C., and returned the internal pressure of the reaction vessel to ordinary pressure with nitrogen. The procedure then ejected the molten material into a metal vessel under a nitrogen atmosphere and cooled down the molten material at room temperature to obtain a solid product of the process (I) (cyclic PAS composition (b) of Example 15). The product of the process (I) was a transparent, brown, brittle solid and was fully soluble in 1-chloronaphthalene at 250° C. The result of HPLC measurement showed that the reduction ratio of cyclic polyphenylene sulfide was 0%. The weight reduction ratio $\Delta Wr(b)$ under heating at 200° C. to 330° C. was 0.115%. The procedure subsequently crushed the obtained product of the process (I) with a hammer, placed the crushed product in the stainless steel reaction vessel with the agitator, and heated and melted the crushed product by the same procedure as that of Example 12 except that the stirring time was 30 minutes, so as to obtain a cyclic PAS pellet. The average maximum length of the obtained cyclic PAS pellet was measured to be 5.4 mm. When 100 g of the above cyclic PAS pellet was vibrated on a 20-mesh sieve (aperture of 0.833 mm) for 2 minutes using a vibrating sieve, the residue on the sieve was 98.3% by weight. The obtained pellet was fully soluble in 1-chloronaphthalene at 250° C. The result of HPLC measurement showed that the reduction ratio of cyclic polyphenylene sulfide was 0%. As clearly understood from the cyclic PAS content of the cyclic PAS composition (a) of Reference Example 1 and the above reduction ratio of cyclic PPS, the content of cyclic PPS in the cyclic PAS composition (p) which the cyclic PAS pellet was comprised of was not less than 50% by weight. The weight reduction ratio $\Delta Wr(p)$ of the above cyclic PAS pellet under heating at 200° C. to 330° C. was 0.098%. The process (II) was then performed by the same procedure as that of Example 12. A product of the process (II) (PAS (c) of Example 15) was an opaque, brown solid and was fully soluble in 1-chloronaphthalene at 250° C. The result of HPLC measurement showed that the reduction ratio of cyclic polyphenylene sulfide was 93%. The result of GPC measurement identified a peak derived from cyclic polyphenylene sulfide and a peak of a produced polymer (polyphenylene sulfide). The weight-average molecular weight of the obtained polyphenylene sulfide was 28,300; the polydispersity was 2.1; and the weight reduction ratio under heating at 100° C. to 330° C. was 0.018%. When the pellet was tried to be conveyed using a screw feeder like Comparative Example 6, the pellet was successfully conveyed without being compacted. The results are shown in Tables 3 to 5.

Example 16

Example 16 performed the same procedure as that of Example 15, except that the melting temperature in the process (I) was 300° C. A product of the process (I) (cyclic PAS composition (b) of Example 16) obtained was a transparent, brown, brittle solid and was fully soluble in 1-chloronaphthalene at 250° C. The result of HPLC measurement showed that the reduction ratio of cyclic polyphenylene sulfide in the cyclic PAS composition (b) was 9%. The weight reduction ratio $\Delta Wr(b)$ of the cyclic PPS composition (b) under heating at 200° C. to 330° C. was 0.048%. The average maximum length of a cyclic PAS pellet obtained was measured to be 5.6 mm. When 100 g of the above cyclic PAS pellet was vibrated on a 20-mesh sieve (aperture of 0.833 mm) for 2 minutes using a vibrating sieve, the residue on the sieve was 98.5% by weight. The obtained pellet was fully soluble in 1-chloronaphthalene at 250° C. The result of HPLC measurement showed that the reduction ratio of cyclic polyphenylene sulfide was 9%. As clearly understood from the cyclic PAS content of the cyclic PAS composition (a) of Reference Example 1 and the above reduction ratio of cyclic PPS, the content of cyclic PPS in the cyclic PAS composition (p) which the cyclic PAS pellet was comprised of was not less than 50% by weight. The weight reduction ratio $\Delta Wr(p)$ of the above cyclic PAS pellet under heating at 200° C. to 330° C. was 0.039%. A product of the process (II) (PAS (c) of Example 16) was an opaque, brown solid and was fully soluble in 1-chloronaphthalene at 250° C. The result of HPLC measurement showed that the reduction ratio of cyclic polyphenylene sulfide was 93%. The result of GPC measurement identified a peak derived from cyclic polyphenylene sulfide and a peak of a produced polymer (polyphenylene sulfide). The weight-average molecular weight of the obtained polyphenylene sulfide was 29,100; the polydispersity was 2.1; and the weight reduction ratio under heating at 100° C. to 330° C. was 0.013%. When the pellet was tried to be conveyed using a screw feeder like Comparative Example 6, the pellet was successfully conveyed without being compacted. The results are shown in Tables 3 to 5.

Comparative Examples 6 and 7 show that the conventionally obtained powdery cyclic PAS composition is compacted in a screw feeder and fails to be conveyed. Examples 12 to 16, on the other hand, show that pelletization of the cyclic PAS composition allows for smooth conveyance. Examples 12 to 14 show that pelletization of the cyclic PAS composition recovered immediately after the process (I) allows for smooth conveyance. Examples 15 and 16 show that pelletization after re-heating and re-melting the cyclic PAS composition recovered after the process (I) also allows for smooth conveyance. Additionally, Examples 12 to 16 show that the resulting pellets have the low gas generation effect, compared with the cyclic PAS composition (a) used as the raw material. Comparison between Examples 12, 13, 15 and 16 and Comparative Examples 1, 2, 4 and 5 and comparison between Example 14 and Comparative Example 3 show that Examples 12 to 16 have the effect of increasing the molecular weight after the process (II).

TABLE 1

| | | Results of Pre-Degassing Analysis (Cyclic PAS Composition (a)) | | Reduced Pressure Condition (Process I) | | | Results of Post-Process I Analysis (Cyclic PAS Composition (b)) | |
|---|---|---|---|---|---|---|---|---|
| | Raw Material Cyclic PAS Composition (a) | Cyclic PPS Content (wt %) | Weight Reduction Ratio (ΔWr(a)) (%) | Temp (° C.) | Pressure (kPa) | Time (hr) | Cyclic PPS Reduction Ratio (%) | Weight Reduction Ratio (ΔWr(b)) (%) |
| EX 1 | Ref Ex 1 | 72 | 1.398 | 250 | 0.01 | 2 | 0 | 0.173 |
| EX 2 | Ref Ex 1 | 72 | 1.398 | 280 | 0.01 | 2 | 0 | 0.144 |
| EX 3 | Ref Ex 1 | 72 | 1.398 | 300 | 0.01 | 2 | 8 | 0.023 |
| EX 4 | Ref Ex 1 | 72 | 1.398 | 250 | 0.01 | 0.5 | 0 | 0.778 |
| EX 5 | Ref Ex 1 | 72 | 1.398 | 280 | 0.01 | 0.5 | 0 | 0.701 |
| EX 6 | Ref Ex 1 | 72 | 1.398 | 300 | 0.01 | 0.5 | 2 | 0.073 |
| EX 7 | Ref Ex 1 | 72 | 1.398 | 300 | 0.01 | 1 | 6 | 0.050 |
| EX 8 | Ref Ex 1 | 72 | 1.398 | 280 | 0.01 | 1 | 0 | 0.125 |
| EX 9 | Ref Ex 1 | 72 | 1.398 | 280 | 1.3 | 1 | 0 | 0.673 |
| EX 10 | Ref Ex 1 | 72 | 1.398 | 280 | 13 | 1 | 0 | 0.889 |
| EX 11 | Ref Ex 2 | 85 | 1.439 | 280 | 0.01 | 1 | 0 | 0.158 |
| COMP EX 1 | Ref Ex 1 | 72 | 1.398 | No Process I | | | No Recovery | |
| COMP EX 2 | Ref Ex 1 | 72 | 1.398 | 340 | 0.01 | (*) | 5 | 1.189 |
| COMP EX 3 | Ref Ex 2 | 85 | 1.439 | No Process I | | | No Recovery | |
| COMP EX 4 | Ref Ex 1 | 72 | 1.398 | 200 | 0.01 | 2 | 0 | 1.242 |
| COMP EX 5 | Ref Ex 1 | 72 | 1.398 | 350 | 0.01 | 1 | 65 | 0.031 |

(*) taking out the vial at temperature reaching 340° C., returning to ordinary pressure with nitrogen at 250° C. and cooling down to room temperature

TABLE 2

| | | Polymerization Condition (Process II) | | | Results of Post-Polymerization Analysis (PAS (c)) | | |
|---|---|---|---|---|---|---|---|
| | Raw Material Cyclic PAS Composition (a) | Temp (° C.) | Pressure (kPa) | Time (hr) | Cyclic PPS Reduction Ratio (%) | Weight-Average Molecular Weight (Mw) | Polydispersity (Mw/Mn) |
| EX 1 | Ref Ex 1 | 340 | 0.01 | 4 | 89 | 28,100 | 2.1 |
| EX 2 | Ref Ex 1 | 340 | 0.01 | 4 | 91 | 28,500 | 2.1 |
| EX 3 | Ref Ex 1 | 340 | 0.01 | 4 | 90 | 29,000 | 2.1 |
| EX 4 | Ref Ex 1 | 340 | 0.01 | 4 | 89 | 26,600 | 2.1 |
| EX 5 | Ref Ex 1 | 340 | 0.01 | 4 | 90 | 27,200 | 2.1 |
| EX 6 | Ref Ex 1 | 340 | 0.01 | 4 | 89 | 28,200 | 2.1 |
| EX 7 | Ref Ex 1 | 340 | 0.01 | 4 | 92 | 28,700 | 2.2 |
| EX 8 | Ref Ex 3 | 340 | 0.01 | 4 | 92 | 28,500 | 2.1 |
| EX 9 | Ref Ex 1 | 340 | 0.01 | 4 | 89 | 27,100 | 2.1 |
| EX 10 | Ref Ex 1 | 340 | 0.01 | 4 | 90 | 26,900 | 2.0 |
| EX 11 | Ref Ex 2 | 340 | 0.01 | 4 | 94 | 48,000 | 2.2 |
| COMP EX 1 | Ref Ex 1 | 340 | 0.01 | 4 | 91 | 25,800 | 2.1 |
| COMP EX 2 | Ref Ex 1 | 340 | 0.01 | 4 | 93 | 25,900 | 2.1 |
| COMP EX 3 | Ref Ex 2 | 340 | 0.03 | 4 | 90 | 43,000 | 2.1 |
| COMP EX 4 | Ref Ex 1 | 340 | 0.01 | 4 | 91 | 25,700 | 2.1 |
| COMP EX 5 | Ref Ex 1 | 340 | 0.01 | 4 | 92 | 25,900 | 2.1 |

TABLE 3

| | Analysis Results of Cyclic PAS Composition (a) | | | Process I | | |
|---|---|---|---|---|---|---|
| | Raw Material Cyclic PAS Composition (a) | Cyclic PPS Content (wt %) | Weight Reduction Ratio (ΔWr(a)) (%) | Temp (° C.) | Pressure (kPa) | Time (hr) |
| COMP EX 6 | Ref Ex 1 | 72 | 1.398 | — | — | — |
| COMP EX 7 | Ref Ex 2 | 85 | 1.439 | — | — | — |
| EX 12 | Ref Ex 1 | 72 | 1.398 | 250 | 0.01 | 2 |
| EX 13 | Ref Ex 1 | 72 | 1.398 | 300 | 0.01 | 1 |
| EX 14 | Ref Ex 2 | 85 | 1.439 | 250 | 0.01 | 2 |

TABLE 3-continued

Analysis Results of Cyclic PAS Composition (a)

| | Raw Material<br>Cyclic PAS<br>Composition (a) | Cyclic PPS<br>Content<br>(wt %) | Weight<br>Reduction<br>Ratio (ΔWr(a))<br>(%) | Process I Temp (° C.) | Pressure (kPa) | Time (hr) |
|---|---|---|---|---|---|---|
| EX 15 | Ref Ex 1 | 72 | 1.398 | 280 | 0.01 | 1 |
| EX 16 | Ref Ex 1 | 72 | 1.398 | 300 | 0.01 | 1 |

TABLE 4

| | Pelletization Process | | | Analysis Results of Pellet | | | | |
|---|---|---|---|---|---|---|---|---|
| | Temp (° C.) | Pressure (kPa) | Time (hr) | Residue on 20-mesh Sieve (wt %) | Maximum Diameter of Pellet (mm) | Cyclic PPS Reduction Ratio (%) | Weight Reduction Ratio (ΔWr(p)) (%) | Ease of Conveyance by Screw Feeder |
| COMP EX 6 | — | — | — | 3.2 | — | 0 | 1.391 | x |
| COMP EX 7 | — | — | — | 2.5 | — | 0 | 1.440 | x |
| EX 12 | — | — | — | 98.5 | 5.3 | 0 | 0.188 | ○ |
| EX 13 | — | — | — | 97.5 | 2.8 | 6 | 0.049 | ○ |
| EX 14 | — | — | — | 98.5 | 5.3 | 0 | 0.185 | ○ |
| EX 15 | 250 | 0.01 | 0.5 | 98.3 | 5.4 | 0 | 0.098 | ○ |
| EX 16 | 250 | 0.01 | 0.5 | 98.5 | 5.6 | 9 | 0.039 | ○ |

TABLE 5

| | Raw Material Cyclic PAS Composition (a) | Geometry | Polymerization Condition (Process II) | | | Cyclic PPS Reducton Ratio (%) | Results of Post-Polymerization Analysis(PAS (c)) | |
|---|---|---|---|---|---|---|---|---|
| | | | Temp (° C.) | Pressure (kPa) | Time (hr) | | Weight-Avarage Molecular Weight (Mw) | Polydispersity (Mw/Mn) |
| EX 12 | Ref Ex 1 | Pellet | 340 | 0.01 | 4 | 90 | 28,700 | 2.1 |
| EX 13 | Ref Ex 1 | Pellet | 340 | 0.01 | 4 | 92 | 29,000 | 2.1 |
| EX 14 | Ref Ex 2 | Pellet | 340 | 0.01 | 4 | 92 | 47,000 | 2.2 |
| EX 15 | Ref Ex 1 | Pellet | 340 | 0.01 | 4 | 93 | 28,300 | 2.1 |
| EX 16 | Ref Ex 1 | Pellet | 340 | 0.01 | 4 | 93 | 29,100 | 2.1 |

The invention claimed is:

1. A method of producing polyarylene sulfide from a cyclic polyarylene sulfide composition (a) which comprises not less than 50% by weight of a cyclic polyarylene sulfide expressed by Formula (1):

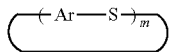

(1)

(where Ar represents an arylene group and m is an integral number of 4 to 50, wherein the cyclic polyarylene sulfide may be a mixture of plural different cyclic polyarylene sulfides having different numbers m), the method comprising:

a process (I) of heating, under reduced pressure, the cyclic polyarylene sulfide composition (a) having not less than 1.0% of a weight reduction ratio ΔWr(a) under heating according to Equation (2) to obtain a cyclic polyarylene sulfide composition (b) which has less than 50% of a reduction ratio of the cyclic polyarylene sulfide to the cyclic polyarylene sulfide composition (a) and has less than 1.0% of a weight reduction ratio ΔWr(b) under heating according to Equation (2), $$\Delta Wr(x) = (W1 - W2)/W1 \times 100\% \quad (2)$$

(where ΔWr(x) denotes a weight reduction ratio (%) of a material (x) and is obtained from a sample weight (W2) at temperature reaching 330° C. relative to a sample weight (W1) at temperature reaching 200° C. in thermogravimetric analysis in a non-oxidizing atmosphere under ordinary pressure with increasing temperature from 50° C. to any temperature of not lower than 330° C. at a temperature rise rate of 20° C./minute); and a process (II) of heating the cyclic polyarylene sulfide composition (b) to obtain a polyarylene sulfide (c) which has not less than 50% of the reduction ratio of the cyclic polyarylene sulfide to the cyclic polyarylene sulfide composition (a) and has a weight-average molecular weight of not less than 10,000.

2. The method according to claim 1, wherein the weight reduction ratio ΔWr(b) of the cyclic polyarylene sulfide composition (b) obtained in the process (I) is less than 0.5%.

3. The method according to claim 1, wherein the process (I) and the process (II) perform heating in a non-oxidizing atmosphere.

4. The method according to claim 1, wherein a heating temperature in the process (I) is not lower than a melting temperature of the cyclic polyarylene sulfide composition (a) and not higher than 300° C.

5. The method according to claim 1, wherein a heating temperature in the process (II) is not lower than a melting temperature of the cyclic polyarylene sulfide composition (b).

6. The method according to claim 1, wherein the process (II) heats the cyclic polyarylene sulfide composition (b) under a solvent-free condition.

7. The method according to claim 1, further comprising pelletizing the cyclic polyarylene sulfide composition (b) obtained in the process (I) before performing the process (II).

8. A cyclic polyarylene sulfide pellet comprised of a cyclic polyarylene sulfide composition (p),
wherein the cyclic polyarylene sulfide composition (p) comprises not less than 50% by weight of a cyclic polyarylene sulfide expressed by Formula (1):

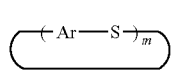

(1)

(where Ar represents an arylene group and m is an integral number of 4 to 50, wherein the cyclic polyarylene sulfide may be a mixture of plural different cyclic polyarylene sulfides having different numbers m), and
the cyclic polyarylene sulfide composition (p) has less than 1.0% of a weight reduction ratio $\Delta Wr(p)$ under heating according to Equation (2), $$\Delta Wr(x) = (W1 - W2)/W1 \times 100\% \quad (2)$$

(where $\Delta Wr(x)$ denotes a weight reduction ratio (%) of a material (x) and is obtained from a sample weight (W2) at temperature reaching 330° C. relative to a sample weight (W1) at temperature reaching 200° C. in thermogravimetric analysis in a non-oxidizing atmosphere under ordinary pressure with increasing temperature from 50° C. to any temperature of not lower than 330° C. at a temperature rise rate of 20° C./minute).

9. The cyclic polyarylene sulfide pellet according to claim 8, wherein when the cyclic polyarylene sulfide pellet is vibrated on a 20-mesh sieve (aperture of 0.833 mm) for 2 minutes or longer using a vibrating sieve, a residue on the sieve is not less than 95% by weight.

10. The cyclic polyarylene sulfide pellet according to claim 8,
wherein the cyclic polyarylene sulfide composition (p) is obtained by heating, under reduced pressure, a cyclic polyarylene sulfide composition (a) which comprises not less than 50% by weight of a cyclic polyarylene sulfide expressed by Formula (1) and has not less than 1.0% of a weight reduction ratio $\Delta Wr(a)$ under heating according to Equation (2), and
the cyclic polyarylene sulfide composition (p) has less than 50% of a reduction ratio of the cyclic polyarylene sulfide to the cyclic polyarylene sulfide composition (a).

11. A method of producing a cyclic polyarylene sulfide pellet comprising:
pelletizing a cyclic polyarylene sulfide composition (b) comprising not less than 50% by weight of a cyclic polyarylene sulfide expressed by Formula (1):

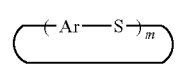

(1)

(where Ar represents an arylene group and m is an integral number of 4 to 50, wherein the cyclic polyarylene sulfide may be a mixture of plural different cyclic polyarylene sulfides having different numbers m) and has less than 1.0% of a weight reduction ratio $\Delta Wr(b)$ under heating according to Equation (2), $$\Delta Wr(x) = (W1 - W2)/W1 \times 100\% \quad (2)$$

(where $\Delta Wr(x)$ denotes a weight reduction ratio (%) of a material (x) and is obtained from a sample weight (W2) at temperature reaching 330° C. relative to a sample weight (W1) at temperature reaching 200° C. in thermogravimetric analysis in a non-oxidizing atmosphere under ordinary pressure with increasing temperature from 50° C. to any temperature of not lower than 330° C. at a temperature rise rate of 20° C./minute).

12. The method according to claim 11, wherein the pelletizing step drops the cyclic polyarylene sulfide composition (b) in a molten state as droplets and subsequently cools down the cyclic polyarylene sulfide composition (b) to obtain the pellet.

13. The method according to claim 2, wherein the process (I) and the process (II) perform heating in a non-oxidizing atmosphere.

14. The method according to claim 2, wherein a heating temperature in the process (I) is not lower than a melting temperature of the cyclic polyarylene sulfide composition (a) and not higher than 300° C.

15. The method according to claim 3, wherein a heating temperature in the process (I) is not lower than a melting temperature of the cyclic polyarylene sulfide composition (a) and not higher than 300° C.

16. The method according to claim 2, wherein a heating temperature in the process (II) is not lower than a melting temperature of the cyclic polyarylene sulfide composition (b).

17. The method according to claim 3, wherein a heating temperature in the process (II) is not lower than a melting temperature of the cyclic polyarylene sulfide composition (b).

18. The method according to claim 4, wherein a heating temperature in the process (II) is not lower than a melting temperature of the cyclic polyarylene sulfide composition (b).

19. The cyclic polyarylene sulfide pellet according to claim 9,
wherein the cyclic polyarylene sulfide composition (p) is obtained by heating, under reduced pressure, a cyclic polyarylene sulfide composition (a) which comprises not less than 50% by weight of a cyclic polyarylene sulfide expressed by Formula (1) and has not less than 1.0% of a weight reduction ratio $\Delta Wr(a)$ under heating according to Equation (2), and
the cyclic polyarylene sulfide composition (p) has less than 50% of a reduction ratio of the cyclic polyarylene sulfide to the cyclic polyarylene sulfide composition (a).

20. The method of producing polyarylene sulfide according to claim 1, wherein the reduced pressure in process (I) is not higher than 50 kPa.

21. The cyclic polyarylene sulfide pellet according to claim 10, wherein the reduced pressure is not higher than 50 kPa.

* * * * *

UNITED STATES PATENT AND TRADEMARK OFFICE
CERTIFICATE OF CORRECTION

| | |
|---|---|
| PATENT NO. | : 9,029,484 B2 |
| APPLICATION NO. | : 14/381803 |
| DATED | : May 12, 2015 |
| INVENTOR(S) | : Kanomata et al. |

It is certified that error appears in the above-identified patent and that said Letters Patent is hereby corrected as shown below:

In the specification,

<u>In Column 43</u>

At Table 2, at Comparative Example 3, at the subtitle Pressure (kPa), please change "0.03" to --0.01--.

Signed and Sealed this
Ninth Day of February, 2016

Michelle K. Lee
*Director of the United States Patent and Trademark Office*